United States Patent
Oh et al.

(10) Patent No.: US 11,068,631 B2
(45) Date of Patent: *Jul. 20, 2021

(54) FIRST PRINCIPLES DESIGN AUTOMATION TOOL

(71) Applicant: Synopsys, Inc., Mountain View, CA (US)

(72) Inventors: Yong-Seog Oh, Pleasanton, CA (US); Michael C. Shaughnessy-culver, Napa, CA (US); Stephen L. Smith, Mountain View, CA (US); Jie Liu, San Jose, CA (US); Victor Moroz, Saratoga, CA (US); Pratheep Balasingam, San Jose, CA (US); Terry Sylvan Kam-Chiu Ma, Danville, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,129

(22) Filed: Aug. 13, 2019

(65) Prior Publication Data

US 2019/0362042 A1 Nov. 28, 2019

Related U.S. Application Data

(63) Continuation of application No. 15/021,655, filed as application No. PCT/US2014/057803 on Sep. 26, 2014, now Pat. No. 10,402,520.

(Continued)

(51) Int. Cl.
| | | |
|---|---|---|
| *G06F 30/33* | (2020.01) | |
| *G06F 30/30* | (2020.01) | |
| *G06F 17/14* | (2006.01) | |

(52) U.S. Cl.
CPC .............. *G06F 30/33* (2020.01); *G06F 17/14* (2013.01); *G06F 30/30* (2020.01)

(58) Field of Classification Search
CPC ........... G06F 30/33; G06F 30/30; G06F 17/14
See application file for complete search history.

(56) References Cited

U.S. PATENT DOCUMENTS

| | | | |
|---|---|---|---|
| 5,246,800 | A | 9/1993 | Muray |
| 5,472,814 | A | 12/1995 | Lin |

(Continued)

FOREIGN PATENT DOCUMENTS

| | | |
|---|---|---|
| WO | 00-72185 A2 | 11/2000 |
| WO | 01-08028 A2 | 2/2001 |
| WO | 02-058158 A2 | 7/2002 |

OTHER PUBLICATIONS

U.S. Appl. No. 14/497,681—Office Action dated Sep. 5, 2018, 22 pages.

(Continued)

*Primary Examiner* — Nha T Nguyen
(74) *Attorney, Agent, or Firm* — Haynes Beffel & Wolfeld LLP; Andrew L. Dunlap

(57) ABSTRACT

An electronic design automation tool includes an application program interface API which includes a set of parameters and procedures supporting atomistic scale modeling of electronic materials. The procedures include a procedure to execute first principles calculations, a procedure to process results from the first principles calculations to extract device scale parameters from the results, a procedure to determine whether the extracted device scale parameters lie within a specified range. The procedures also include a procedure to parameterize an input parameter of a first principles procedure, including a procedure to execute a set of DFT computations across an input parameter space to characterize sensitivity of one of the intermediate parameter and the (Continued)

output parameter. Also included is a procedure to execute a second set of DFT computations across a refined input parameter space. The procedures include a procedure that utilizes DFT computations to parameterize the force field computations.

18 Claims, 11 Drawing Sheets

Related U.S. Application Data

(60) Provisional application No. 61/888,954, filed on Oct. 9, 2013, provisional application No. 61/883,942, filed on Sep. 27, 2013, provisional application No. 61/883,158, filed on Sep. 26, 2013, provisional application No. 61/887,274, filed on Oct. 4, 2013, provisional application No. 61/887,234, filed on Oct. 4, 2013, provisional application No. 61/888,441, filed on Oct. 8, 2013.

(56) References Cited

U.S. PATENT DOCUMENTS

| | | | |
|---|---|---|---|
| 5,702,847 | A | 12/1997 | Tarumoto et al. |
| 6,057,063 | A | 5/2000 | Liebmann et al. |
| 6,096,458 | A | 8/2000 | Hibbs |
| 6,685,772 | B2 | 2/2004 | Goddard, III et al. |
| 7,448,022 | B1 | 11/2008 | Ram et al. |
| 7,756,687 | B2 | 7/2010 | Hwang et al. |
| 8,082,130 | B2 | 12/2011 | Guo et al. |
| 8,112,231 | B2 | 2/2012 | Samukawa |
| 8,434,084 | B2 | 4/2013 | Ferdous et al. |
| 8,453,102 | B1 | 5/2013 | Pack et al. |
| 8,454,748 | B2 | 6/2013 | Iwaki et al. |
| 8,555,281 | B1 | 10/2013 | van Dijk et al. |
| 8,572,523 | B2 | 10/2013 | Tuncer et al. |
| 8,626,480 | B2 | 1/2014 | Chang et al. |
| 8,871,670 | B2 | 10/2014 | Seebauer |
| 9,727,675 | B2 | 8/2017 | Liu et al. |
| 9,922,164 | B2 | 3/2018 | Chennamsetty et al. |
| 9,983,979 | B1 | 5/2018 | Dolinsky et al. |
| 2002/0142495 | A1 | 10/2002 | Usujima |
| 2003/0217341 | A1 | 11/2003 | Rajsuman et al. |
| 2003/0217343 | A1 | 11/2003 | Rajsuman et al. |
| 2004/0063225 | A1 | 4/2004 | Borden et al. |
| 2004/0067355 | A1 | 4/2004 | Yadav et al. |
| 2004/0107056 | A1* | 6/2004 | Doerksen .............. G16C 10/00 702/27 |
| 2005/0170379 | A1 | 8/2005 | Kita et al. |
| 2005/0223633 | A1 | 10/2005 | Sankaranarayanan |
| 2005/0278124 | A1 | 12/2005 | Duffy et al. |
| 2005/0281086 | A1 | 12/2005 | Kobayashi et al. |
| 2006/0038171 | A1 | 2/2006 | Hasumi et al. |
| 2006/0101378 | A1 | 5/2006 | Kennedy et al. |
| 2006/0271301 | A1 | 11/2006 | Takada et al. |
| 2007/0177437 | A1 | 8/2007 | Guo |
| 2007/0185695 | A1 | 8/2007 | Neumann |
| 2007/0265725 | A1 | 11/2007 | Liu et al. |
| 2008/0052646 | A1 | 2/2008 | Tuncer et al. |
| 2008/0147360 | A1 | 6/2008 | Fejes et al. |
| 2009/0032910 | A1 | 2/2009 | Ahn et al. |
| 2010/0052180 | A1 | 3/2010 | Nguyen Hoang et al. |
| 2010/0070938 | A1 | 3/2010 | Wang et al. |
| 2010/0318331 | A1 | 12/2010 | Ritchie |
| 2011/0131017 | A1 | 6/2011 | Cheng et al. |
| 2011/0161361 | A1 | 6/2011 | Csanyi et al. |
| 2011/0231804 | A1 | 9/2011 | Liu et al. |
| 2011/0246998 | A1 | 10/2011 | Vaidya et al. |
| 2011/0313741 | A1 | 12/2011 | Langhoff |
| 2011/0313748 | A1 | 12/2011 | Li |
| 2012/0228615 | A1 | 9/2012 | Uochi |
| 2012/0232685 | A1 | 9/2012 | Wang et al. |
| 2013/0139121 | A1 | 5/2013 | Wu et al. |
| 2014/0180645 | A1 | 6/2014 | Lee et al. |
| 2014/0251204 | A1 | 9/2014 | Najmaei et al. |
| 2015/0088473 | A1 | 3/2015 | Liu et al. |
| 2015/0088481 | A1 | 3/2015 | Liu et al. |
| 2015/0089511 | A1 | 3/2015 | Smith et al. |
| 2015/0120259 | A1 | 4/2015 | Klimeck et al. |
| 2016/0171139 | A1 | 6/2016 | Tago et al. |
| 2016/0335381 | A1 | 11/2016 | Liu et al. |

OTHER PUBLICATIONS

U.S. Appl. No. 14/497,695—Office Action dated Sep. 21, 2018, 18 pages.
U.S. Appl. No. 15/021,655—Notice of Allowance dated Nov. 7, 2018, 13 pages.
U.S. Appl. No. 15/021,655—Response to Office Action dated Apr. 19, 2018 filed Jul. 18, 2018, 17 pages.
U.S. Appl. No. 15/224,165—Response to Office Action dated Aug. 7, 2018 filed Dec. 4, 2018, 14 pages.
U.S. Appl. No. 14/497,695—Response to Office Action dated Sep. 21, 2018 filed Jan. 22, 2019, 15 pages.
U.S. Appl. No. 14/497,681—Response to Final Office Action dated May 11, 2018 filed Jul. 13, 2018, 12 pages.
U.S. Appl. No. 14/497,681—Response to Office Action dated Sep. 5, 2018 filed Dec. 5, 2018, 11 pages.
U.S. Appl. No. 14/497,681—Final Office Action dated Feb. 7, 2019, 23 pages.
U.S. Appl. No. 15/224,165—Final Office Action dated Feb. 6, 2019, 14 pages.
U.S. Appl. No. 14/497,695—Notice of Allowance dated May 13, 2019, 10 pages.
PCT/US2014/057803—International Preliminary Report on Patentability dated Mar. 29, 2016, 10 pages.
U.S. Appl. No. 14/497,681—Response to Final Office Action dated Feb. 7, 2019, filed Jun. 6, 2019, 9 pages.
Capelle, "A Bird's-Eye View of Density-Functional Theory", Departamento de Fisica e Informatica Instituto de Fisica de Sao Carlos, Universidade de Sao Paulo, Caixa Postal 369, Sao Carlos, 13560-970 SP, Brazil, arXiv:cond-mat/0211443v5 [cond-mat.mtrl-sci], Nov. 18, 2006, pp. 1- 69.
U.S. Appl. No. 14/497,695—Amendment After Allowance filed Jun. 11, 2019, 8 pages.
U.S. Appl. No. 15/021,655—Notice of Allowance dated May 1, 2019, 12 pages.
U.S. Appl. No. 15/224,165—Response to Final Office Action dated Feb. 6, 2019 filed Jun. 13, 2019, 13 pages.
U.S. Appl. No. 15/224,165—Advisory Action dated Jun. 27, 2019, 4 pages.
U.S. Appl. No. 14/497,681—Notice of Allowance dated Jul. 25, 2019, 22 pages.
U.S. Appl. No. 15/861,605—Office Action dated Aug. 2, 2019, 32 pages.
U.S. Appl. No. 14/497,695—Amendment with RCE filed Aug. 6, 2019, 8 pages.
U.S. Appl. No. 14/497,695—Notice of Allowance dated Aug. 14, 2019, 11 pages.
U.S. Appl. No. 15/224,165—Final Office Action dated Sep. 20, 2019, 22 pages.
Pomorski et al., "Capacitance, induced charges, and bound states of biased carbon nanotube systems," 2004, Physical Review B 69.11, 115418, pp. 1-16.
Zhu et al., "Time-dependent quantum transport: Direct analysis in the time domain," 2005, Physical Review B 71.7: 075317, pp. 1-10.
PCT/US2014/057840—International Search Report dated Nov. 28, 2014, 9 pages.
U.S. Appl. No. 15/081,735—Office Action dated Jun. 15, 2016, 16 pages.
Saha et al., Technology CAD: Technology Modeling, Device Design and Simulation, 2004 VLSI Design Tutorial, Mubai, India, Jan. 5, 2004, 227 pages.
U.S. Appl. No. 14/497,681—Office Action dated Aug. 25, 2016, 20 pages.

(56) References Cited

OTHER PUBLICATIONS

Ayyadi et al., Semiconductor Simulations Using a Coupled Quantum Drift-Diffusion Schrodinger-Poisson Model, Aug. 12, 2004, Vienna University of Technology, pp. 1-19.
Kresse, G., et. al., VASP the Guide (Sep. 9, 2013), pp. 203.
U.S. Appl. No. 15/024,009—Final Office Action dated Nov. 18, 2016, 24 pages.
U.S. Appl. No. 15/081,735—Office Action dated Dec. 13, 2016, 30 pages.
PCT/US2014/057840—International Preliminary Report on Patentability dated Mar. 29, 2016, 5 pages.
U.S. Appl. No. 15/081,735—Response to Office Action dated Jun. 15, 2016 filed Nov. 15, 2016, 18 pages.
PCT/US2014/057803—International Search Report and Written Opinion dated Nov. 28, 2014, 14 pages.
U.S. Appl. No. 15/024,009—Office Action dated Jul. 21, 2016, 24 pages.
U.S. Appl. No. 15/024,009—Response to Office Action dated Jul. 21, 2016 filed Nov. 1, 2016, 38 pages.
U.S. Appl. No. 15/024,009—Preliminary Amendment filed Mar. 22, 2016, 9 pages.
U.S. Appl. No. 14/497,681—Response to Office Action dated Aug. 25, 2016 filed Jan. 24, 2017, 10 pages.
U.S. Appl. No. 14/906,543—Response to Office Action dated Jun. 17, 2016 filed Dec. 19, 2016, 23 pages.
U.S. Appl. No. 14/906,543—Final Office Action dated Feb. 10, 2017, 16 pages.
U.S. Appl. No. 14/906,543—Preliminary Amendment dated Jan. 20, 2016, 8 pages.
U.S. Appl. No. 15/081,735—Response to Office Action dated Dec. 13, 2016, filed Mar. 13, 2017, 10 pages.
Lee et al., "Area and Volume Measurements of Objects with Irregular Shapes Using Multiple Silhouettes," Optical Engineering 45(2), Feb. 2006, 11 pages.
Keneti, et al., "Determination of Volume and Centroid of Irregular Blocks by a Simplex Integration Approach for Use in Discontinuous Numerical Methods," Geomechanics and Geoengineering: An International Journal, vol. 3, No. 1, Mar. 2008, pp. 79-84.
U.S. Appl. No. 15/081,735—Notice of Allowance dated Mar. 29, 2017, 17 pages.
U.S. Appl. No. 14/497,681—Final Office Action dated May 3, 2017, 28 pages.
Isik, A., "Molecular Dynamics Simulation of Silicon Using Empirical Tight-Binding Method," Massachusetts Institute of Technology, Jan. 1992, 89 pages.
Miloszewski, J., "Simulations of Semiconductor Laser Using Non-equilibrium Green's Functions Method," University of Waterloo, 2012, 129 pages.
U.S. Appl. No. 15/024,009—Response to Final Office Action dated Nov. 18, 2016 filed Mar. 20, 2017, 24 pages.
Jegert, et al. "Role of Defect Relaxation for Trap-Assisted Tunneling in High-k Thin Films: A First-Principles Kinetic Monte Carlo Study." Physical Review B 85.4 (2012), 8 pages.
U.S. Appl. No. 14/497,695—Office Action dated Jul. 13, 2017, 26 pages.
U.S. Appl. No. 14/498,492—Notice of Allowance dated Aug. 14, 2017, 28 pages.
Clark, "Quantum Mechanics: Density Functional Theory and Practical Application to Alloys." Introduction to Compter Simulation (2010), 51 pages.
U.S. Appl. No. 14/906,543—Response to Final Office Action dated Feb. 10, 2017 filed Jun. 23, 2017, 15 pages.
U.S. Appl. No. 14/906,543—Advisory Action dated Aug. 2, 2017, 4 pages.
U.S. Appl. No. 14/498,458—Notice of Allowance dated Sep. 7, 2017, 29 pages.
U.S. Appl. No. 15/669,722—Office Action dated Oct. 6, 2017, 30 pages.
U.S. Appl. No. 14/497,681—Response to Final Office Action dated May 3, 2017 filed Nov. 3, 2017, 13 pages.
U.S. Appl. No. 14/497,681—Office Action dated Dec. 20, 2017, 25 pages.
U.S. Appl. No. 15/669,722—Notice of Allowance dated Mar. 7, 2018, 5 pages.
U.S. Appl. No. 15/669,722—Response to Office Action dated Oct. 6, 2017 filed Jan. 10, 2018, 3 pages.
U.S. Appl. No. 14/497,681—Response to Office Action dated Dec. 20, 2017 filed Mar. 20, 2018, 11 pages.
U.S. Appl. No. 14/497,695—Final Office Action dated May 3, 2018, 14 pages.
U.S. Appl. No. 14/497,695—Response to Office Action dated Jul. 13, 2017 filed Jan. 16, 2018, 19 pages.
U.S. Appl. No. 15/021,655—Office Action dated Apr. 19, 2018, 43 pages.
U.S. Appl. No. 14/497,681—Final Office Action dated May 11, 2018, 19 pages.
U.S. Appl. No. 14/497,681—Advisory Action dated Aug. 3, 2018, 7 pages.
Bortolossi, "3D Finite Element Drift-Diffusion Simulation of Semiconductor Devices," Jul. 25, 2014, Politecnico di Milano, 132 pages.
Taylor et al., "Ab initio modeling of quantum transport properties of molecular electronic devices", 2001, Physical Review B 63.24, 245407, pp. 1-13.
Sverdlov et al., "Current Transport Models for Nanoscale Semiconductor Devices," 2008, Materials Science and Engineering: R: Reports 58.6, pp. 228-270.
U.S. Appl. No. 15/224,165—Office Action dated Aug. 7, 2018, 47 pages.
U.S. Appl. No. 14/497,695—Advisory Action dated Aug. 23, 2018, 3 pages.
U.S. Appl. No. 14/497,695—Response to Final Office Action dated May 3, 2018 filed Aug. 29, 2018, 31 pages.
Martin-Bragado et al., "Modeling charged defects, dopant diffusion and activation mechanisms for TCAD simulations using Kinetic Monte Carlos," Nuclear Instruments and Methods in Physics Research Section B: Beam Interactions with Materials and Atoms, 253:1, 18 pages, Dec. 2006.
Dunga, Mohan V., et al., "BSIM4.6.0 MOSFET Model—User's Manual", Department of Electrical Engineering and Computer Sciences, University of California, Berkeley, CA USA, 2006, 201 pages.
Nagel, et al., "Spice (Simulation Program with Integrated Circuit Emphasis)", Memorandum No. ERL-M382, Electronics Research Laboratory, College of engineering, University of California, Berkeley, CA USA, (Apr. 12, 1973), 65 pages.
Nagel, Laurence W., "SPICE2: A Computer Program to Simulate Semiconductor Circuits", Memorandum No. UCB/ERL-M520, Electronics Research Laboratory, College of Engineering, University of California, Berkeley, CA USA, (May 9, 1975), 431 pages.
Synopsys, Sentaurus TCAD, Industry-Standard Process and Device Simulators, Datasheet (2012), 4 pages.
Yip, S. (ed.), Handbook of Materials Modeling, 565-588. c 2005 Springer.
PCT/US2014/057637—International Search Report and Written Opinion dated Jan. 5, 2015, 12 pages.
Wang, Yan, "Multiscale Simulations", Georgia Institute of Technology, available at http://www-old.me.gatech.edu/~ywang/CANE/lect05_MultiscaleSims_yanwang.pdf, (dated May 14-16, 2012), 40 pages.
Braunstein, Rubin, et al., "Intrinsic Optical Absorption in Germanium-Silicon Alloys", Physical Review, vol. 109, No. 3, (Feb. 1, 1958), pp. 695-710.
Sant, Saurabh, et al., "Band gap bowing and band offsets in relaxed and strained Si1-xGex alloys by employing a new nonlinear interpolation scheme", published online Jan. 18, 2013, Journal of Applied Physics, vol. 113, pp. 033708-1 through 033708-10.
Uppal, S., et al., "Diffusion of boron in germanium at 800-900° C.", Journal of Applied Physics, vol. 96, No. 3, (Aug. 1, 2004), pp. 1376-1380.
Haddara, Y.M., et al., "Accurate measurements of the intrinsic diffusivities of boron and phosphorus in silicon", Applied Physics Letters, vol. 77, No. 13, (Sep. 25, 2000), pp. 1976-1978.

(56) References Cited

OTHER PUBLICATIONS

Uppal, S., et al., "Diffusion of ion-implanted boron in germanium", Journal of Applied Physics, vol. 90, No. 8, (Oct. 2001), 4293-4295.

Stadler, J., et al., "IMD: a Software Package for Molecular Dynamics Studies on Parallel Computers", International Journal of Modren Physics C, vol. 8, No. 5, (Oct. 1997), pp. 1131-1140.

Refson, Keith, "Moldy: a portable molecular dynamics simulation program for serial and parallel computers", Computer Physics Communications, vol. 126, issue 3, (Apr. 11, 2000), pp. 310-329.

Smith, W., et al., "DL_POLY: Application to molecular simulation", Molecular Simulation, vol. 28, Issue 5, (May 5, 2002), pp. 385-471.

Smith, W., and Forester, T.R., "DL_POLY_2.0: A general-purpose parallel molecular dynamics simulation package", Journal of Molecular Graphics, vol. 14, Issue 3, (Jun. 1996), pp. 136-141.

Nieminen, Risto M., "From atomistic simulation towards multiscale modelling of materials", J. Phys.: Condens. Matter, (published Mar. 8, 2002), vol. 14, pp. 2859-2876.

"Simulation of Random Dopant Fluctuation Effects in TCAD Sentaurus", TCAD News, Dec. 2009, Synopsys, Mountain View, CA, USA, 4 pages.

Yu, P.Y., and Cardona, M., "2. Electronic Band Structures", Fundamentals of Seminconductors, Graduate Texts in Physics, 4th ed., Springer-Verlag Berlin Heidelberg, (2010), pp. 17-106.

"ITRS, International Technology Roadmap for Semiconductors, 2012 Update", (2012), available at http://www.itrs.net/Links/2012ITRS/2012Chapters/2012Overview.pdf, 76 pages.

"Sentaurus TCAD" datasheet, Synopsys, Inc., Mountain View, CA USA, May 2012, 4 pages.

"ITRS, 2012 Overall Roadmap Technology Characteristics (ORTC) Tables", International Technology Roadmap for Semiconductors, 2012, availalbe at http://www.itrs.net/Links/2012ITRS/2012Tables/ORTC_2012Tables.xlsm, visited Oct. 14, 2013, 39 pages.

Hansen, Stephen E., "SUPREM-III User's Manual, Version 8628", (Aug. 1986), available from http://www-tcad.stanford.edu/tcad/programs/suprem3man.pdf, visited Oct. 14, 2013, 186 pages.

"Sentaurus Device" datasheet, Synopsys, Inc., Mountain View, CA, USA, Feb. 2007, 8 pages.

Dunham, Scott T., "A Quantitative Model for the Coupled Diffusion of Phosphorus and Point Defects in Silicon", J. Electrochem. Soc., vol. 139, No. 9, (Sep. 1992), pp. 2628-2636.

Skinner, Richard D., editor, "Basic Integrated Circuit Manufacturing", section 2 of "Technology Reference Manual", ICE, Integrated Circuit Engineering, (1993), 112 pages.

Quarles, Thomas Linwood, "Analysis of Performance and Convergence Issues for Circuit Simulation", Memorandum No. UCB/ERL M89/42, Electronics Research Laboratory, College of Engineering, University of California, Berkeley, CA USA, (Apr. 1989), 142 pages.

Burke, Kieron, and friends, "The ABC of DFT", Department of Chemistry, University of California, Irvine, CA, (Apr. 10, 2007), available at http://chem.ps.uci.edu/~kieron/dft/book/, 104 pages.

Luisier, Mathieu, "Quantum Transport Beyond the Effective Mass Approximation", Diss. ETH No. 17016, 2007, 150 pages.

Taur, Y., "CMOS design near the limit of scaling", IBM J. Res. & Dev., vol. 46, No. 2/3, Mar./May 2002, pp. 213-212.

Luisier, Mathieu, "Quantum Transport for Engineers Lecture 4: Wave Function (WF) formalism and electrostatics", Integrated Systems Laboratory, ETH Zurich (2012), 34 pages.

Kim, Kyoung-Youm and Lee, Byoungho, "Quantum transport modeling in anisotropic semiconductors using Wigner function formulation", Proceedings Conference on Optoelectronic and Microelectronic Materials and Devices, COMMAD 2000. (2000), pp. 4.

Arovas, Daniel "Lecture Notes on Condensed Matter Physics, Chapter 1 Boltzmann Transport", Department of Physics, University of California, San Diego (2010), pp. 46.

Grau-Crespo, R. "Electronic structure and magnetic coupling in FeSbO4: A DFT study using hybrid functionals and GGA+U methods", Physical Review B 73, (2006), pp. 9.

Côté, Michel, "Introduction to DFT+U", International Summer School on Numerical Methods for Correlated Systems in Condensed Matter, Université de Montréal, (May 26 to Jun. 6, 2008), pp. 23.

Muramatsu, A., "Quantum Monte Carlo for lattice fermions", in: M.P. Nightingale, C.J. Umriga (Eds.), Proceedings of the NATO Advanced Study Institute on Quantum Monte Carlo Methods in Physics and Chemistry, Kluwer Academic Publishers, (1999), pp. 32.

Gross, E.K.U. and Maitra, N.T., "Introduction to TDDFT", Chapter in Fundamentals of Time-Dependent Density Functional Theory, Springer-Verlag (2012), 58 pages.

Marques, M.A.L. and Gross, E.K.U., "Time-dependent density functional theory," C. Fiolhais, F. Nogueira, M.A.L. Marques (Eds.), A Primer in Density Functional Theory, Springer Lecture Notes in Physics, vol. 620, Springer (2003), pp. 144-184.

Ryndyk, D.A., "Tight-binding model", Lectures 2006-2007, Dresden University of Technology, (2006-2007), pp. 26-30.

Bank, R.E., "Numerical Methods for Semiconductor Device Simulation", IEEE Transactions on Electron Devices, vol. ED-30, No. 9, (1983), pp. 1031-1041.

Lee, J.F., "Time-Domain Finite-Element Methods", IEEE Transactions on Antenna and Propagation, vol. 45, No. 3, (1997), pp. 430-442.

Eymard, R., "Finite Volume Methods", course at the University of Wroclaw, (2008), manuscript update of the preprint 'No. 97-19 du LATP, UMR 6632, Marseille, (Sep. 1997), Handbook of Numerical Anaylsis P.G. Ciarlet, J.L. Lions, eds. vol. 7, pp. 713-1020.

Chen, X.L., "An advanced 3D boundary element method for characterizations of composite materials", Engineering Analysis with Boundary Elements 29, (2005), pp. 513-523.

Marx, D., "Ab initio molecular dynamics: Theory and Implementation", Modern Methods and Algorithms of Quantum Chemistry, J. Grotendorst (Ed.), John von Neumann Institute for Computing, Julich, NIC Series, vol. 1, (2000), pp. 150.

Kresse, Georg, et al., "VASP the Guide",http://cms_mpi.univie.ac.atNASP, Sep. 9, 2013, Vienna, Austria, pp. 1-203.

PCT/US2014/057707—International Search Report and Wirtten Opinion dated Dec. 29, 2014, 16 pages.

PCT/US2014/057707—International Preliminary report on Patentability, dated Apr. 29, 2016, 8 pages.

PCT/US2014/057637—International Preliminary Report on Patentability dated Mar. 29, 2016, 7 pages.

U.S. Appl. No. 14/906,543—Office Action dated Jun. 17, 2016, 26 pages.

\* cited by examiner

FIRST PRINCIPLES DESIGN AUTOMATION TOOL

REFERENCE TO RELATED APPLICATIONS

This application is a continuation of U.S. application Ser. No. 15/021,655, filed Mar. 11, 2016, entitled "FIRST PRINCIPLES DESIGN AUTOMATION TOOL", which application is a U.S. National Stage of International Application No. PCT/US2014/057803, filed Sep. 26, 2014, entitled "FIRST PRINCIPLES DESIGN AUTOMATION TOOL", which application claims the benefit U.S. Provisional Application No. 61/888,954, filed Oct. 9, 2013, entitled "PARAMETER EXTRACTION ENVIRONMENT OF KMC/CONTINUUM DIFFUSION MODELS BY FIRST PRINCIPLE", U.S. Provisional Application No. 61/883,158, filed 26 Sep. 2013, entitled "CONNECTING FIRST-PRINCIPLES CALCULATIONS WITH TRANSISTOR CHARACTERIZATION", U.S. Provisional Application No. 61/883,942, filed 27 Sep. 2013, entitled "CONNECTING FIRST-PRINCIPLES CALCULATIONS WITH TRANSISTOR CHARACTERIZATION", U.S. Provisional Application No. 61/887,274, filed Oct. 4, 2013, entitled "TOOL FOR IDENTIFYING INTERSTITIAL DEFECT AND IMPURITY CONFIGURATIONS", U.S. Provisional Application No. 61/887,234, filed 4 Oct. 2013, entitled "TOOL FOR ADAPTIVE SAMPLING OF DFT", and U.S. Provisional Application No. 61/888,441, filed Oct. 8, 2013, entitled "TOOL USING ACCELERATED DENSITY FUNCTIONAL THEORY SIMULATIONS OF MATERIALS FOR MULTISCALE MATERIALS MODELING PARAMETERIZATION". Each of the applications listed above is incorporated by reference, as if fully set forth herein.

BACKGROUND

The present technology relates to electronic design automation tools, and processes for improving utilization of computing resources required in such tools.

Electronic design automation EDA tools include a class of physical simulation tools used for investigating at a device scale, the properties of materials and the performance of devices made using such materials. Representative physical simulation tools include Sentaurus™ provided by Synopsys, Inc. in Mountain View, Calif. Such tools are optimized to model devices based on well-known materials, such as silicon based materials, for which long experience has resulted in good understanding of the physical parameters needed to simulation.

It is desirable to extend the processes of such tools to materials for which the physical parameters are not well understood, and to new materials.

Atomistic scale models can be used to characterize materials at an atomic level. Such models can produce data needed to estimate the physical parameters of materials with minimal input data that characterizes a set of atoms, and defects in the set of atoms.

Atomistic scale models include density functional theory (DFT) and molecular dynamics (MD) classes of models. These models are based on ab initio, or first principles, calculations of electronic structures based on quantum physics theories. First principles models can be used to compute thermodynamic and transport properties of pure materials, defects and dopants.

Physical parameters needed by kinetic Monte Carlo (KMC) and continuum calculations, such as those used in the Sentaurus product, can be derived from the results of first principles calculations, which in turn can be used to derive device properties. Thus, first principles models are a potential tool for determining estimates of parameters usable for physical simulation based on new materials and other materials that are not already well characterized.

These processes have very intensive computing resource requirements, in terms of time for execution and the processor power needed. It is desirable to provide technologies that can optimize utilization of the computing resources.

The accuracy of first principles calculations depends on the input variables for approximation such as cell size, cut-off energy, k-points, and so on. As each iteration of first principles calculation typically requires a considerable amount of computing resources (e.g., CPU time), trial and error approaches with various approximations are often used. As a result of the complexities of iterations, performing first principles calculations is difficult. First principles calculations can require in-depth understanding of quantum physics and related theories, and can take a person significant amount of time to understand the calculations. Also, it can require manual work to extract physical parameters from results of the first principles calculations.

It is thus desirable to provide a method to automatically execute first principles calculations based on user input, analyze results from the first principles calculations, and extract physical parameters from the results for use in device scale simulation processes, including KMC and continuum calculations.

SUMMARY

The technology disclosed herein relates to data processing systems and methods that can make use of first principles calculations practical for electronic design automation by for example reducing the number of first principles calculations required without sacrificing quality of the results, and automatically extracting physical parameters from the results for use in device scale models.

An electronic design automation EDA tool as described herein can include an application program interface API, which comprises a set of parameters and functional modules with a specified user interface, to support multi-scale modeling processes.

In one aspect described herein, the EDA tool comprises a data processing system including a program interface that includes a plurality of procedures executable using a set of input parameters, the set of input parameters including a material specification, the plurality of procedures including a procedure to produce inputs defining initial conditions of first principles calculations, a procedure to execute sequences of first principles calculations using the inputs, and a procedure to process results from the first principles calculations to extract device scale parameters from the results.

In one aspect described herein the API includes alone or in combination with other procedures, a procedure to execute first principles calculations; a procedure to process results from the first principles calculations to extract device scale parameters from the results; and a procedure to determine whether the device scale parameters extracted from the results lie within a specified range of the stored information for the material.

In one aspect described herein, the API includes alone or in combination with other procedures, a procedure to parameterize an input parameter of a first principles procedure, a procedure to execute sequences of first principles calculations using the inputs to produce an intermediate parameter, and a procedure to process results, including the intermediate parameter, from the first principles calculations to extract device scale parameters as output parameters. The tool in this aspect includes a procedure to execute a first principles procedure, such as a set of DFT computations, across an input parameter space to characterize sensitivity of one of the intermediate parameter and the output parameter to the input parameter space, and also a procedure to execute a second first principles procedure, such as a set of DFT computations, across a refined input parameter space.

In one aspect described herein the API includes alone or in combination with other procedures, a first atomistic scale procedure, including for example, molecular dynamics or force field computations, to produce a set of preliminary configurations for the specified material, and a second atomistic scale procedure that utilizes DFT computations to refine the preliminary configurations and to produce the parameter set using refined configurations. The procedures include a procedure that utilizes DFT computations to parameterize the force field computations.

In one aspect described herein the API includes a combination of procedures to parameterize the input sets of atomistic scale computations and procedures to process the results of atomistic scale procedures to reduce the amount of the data processing resources being deployed, improve the accuracy of the results, and reduce the time required to obtain useful results.

DETAILED DESCRIPTION

Figure 1:
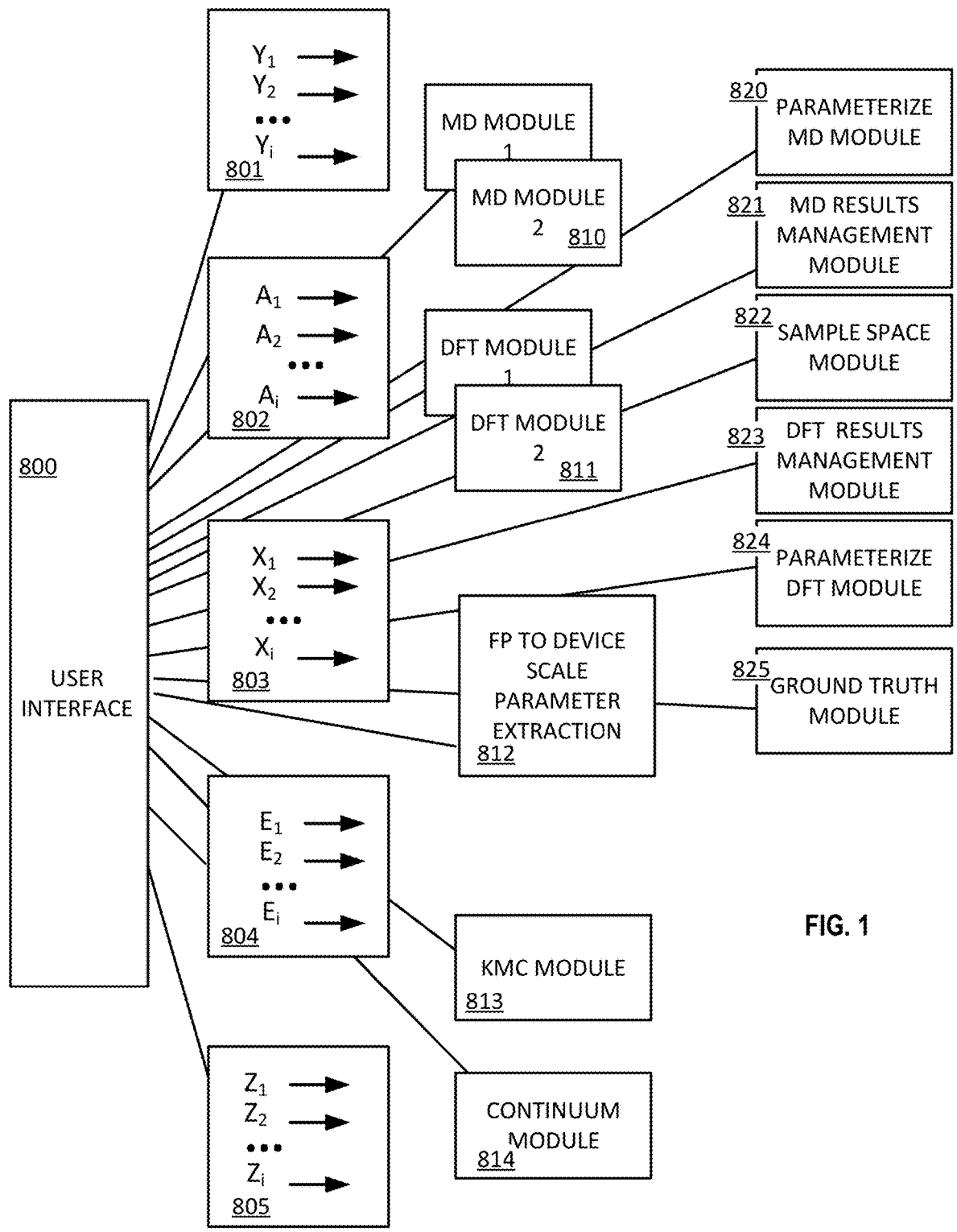
FIG. 1 illustrates an application program interface supporting first principles computations is described herein.

FIG. 1 is a diagram of an application program interface API for an electronic design automation tool supporting first principles simulations and analysis of electronic materials. The API includes a user interface 800 and a set of parameters and procedures which are configured to be controlled using the user interface 800, and provide results usable in the design of integrated circuits. The user interface can be configured to accept command lines, to accept inputs via a graphical user interface, and to accept a combination of various types of inputs. The radial lines extending from the user interface 800 reflect the association of the various parameter sets and procedures with the user interface.

In the illustrated API, a plurality of parameter sets are indicated, including the parameter set {Y} in block 801, the parameter set {A} in block 802, the parameter set {X} in block 803, the parameter set {E} in block 804, and the parameter set {Z} in block 805. In addition to the parameter sets, other parameters (illustrated by the radial lines connecting the procedures to the user interface 800) can be included in the API that are used to select procedural modules and sequences of procedural modules to achieve results desired by the user.

In the illustrated API, a plurality of procedures is implemented, including one or more molecular dynamics modules 810, one or more DFT modules 811, at least one module for extracting device scale parameters from the atomistic scale parameters derived from first principles calculations 812, the physical layer or device layer simulation module such as the kinetic Monte Carlo module 813, and the continuum module 814. KMC calculations use Monte Carlo methods to simulate changes over time such as interactions of dopants with point defects at a device scale involving volumes of the material suitable for use in the formation of electronic devices. Continuum calculations include diffusion models such as a five-stream diffusion model to simulate dopant behaviors at a device scale involving volumes of the material suitable for use in the formation of electronic devices. KMC and continuum calculations can be implemented by one or more programs executed by one or more computer systems. One example program for KMC and continuum calculations is the Sentaurus Process Tool developed by Synopsys, Inc. in Mountain View, Calif.

The parameter set {Y} can comprise a set of input parameters for a molecular dynamics module. The parameter set {A} can comprise a set of input parameters for a molecular dynamics module which are computed using another functional module, such as a DFT module 811. The parameter set {X} can comprise the input variables for a DFT module 811. The parameter set {E} can represent outputs produced by DFT computations or MD computations. The parameter set {Z} can represent the input parameters for a device scale simulating module such as the KMC module 813 and the continuum module 814, and can be produced by the extraction module 812 in some embodiments.

The molecular dynamics modules 810 and the DFT modules 811 include programs for intensive mathematical computations needed to support the atomistic scale simulation. One molecular dynamics procedure is known as LAMMPS, as mentioned below. Other molecular dynamics procedures that can be utilized include DL_POLY (W. Smith and T. R. Forester, "DL POLY 2.0: a general-purpose parallel molecular dynamics simulation package," J. Mol. Graph., 14, 136-141, 1996; and W. Smith, C. W. Yong, and P. M. Rodger, "DL POLY: application to molecular simulation," Mol. Simul., 28, 385-471, 2002); Moldy (K. Refson, "Moldy: a portable molecular dynamics simulation program for serial and parallel computers," Comput. Phys. Commun., 126, 310-329, 2000); and IMD (J. Stadler, R. Mikulla, and H.-R. Trebin, "IMD: A Software Package for Molecular Dynamics Studies on Parallel Computers," Int. J. Mod. Phys. C, 8, 1131-1140, 1997).

A Vienna Ab initio Simulation Package VASP, which is commercially available, can be used for DFT computations.

The molecular dynamics modules 810 and the DFT modules 811 are examples of First Principles Analysis modules. A First Principles Analysis module is a module that can provide, among other things, total energy calculations required to parameterize diffusion models. Some atomistic simulation methods, particularly density functional theory (DFT) calculations, are commonly referred to as ab initio or first principles tools because they require minimal empirical input to generate accurate ground state total energies for arbitrary configurations of atoms. These tools make use of the most fundamental governing quantum mechanical equations, and require very little in the way of externally-supplied materials parameters. This capability makes these methods well-suited to investigating new materials and to providing highly detailed physical insight into materials properties and processes. As used herein, an "ab initio" or "first principles" analysis module is a module that develops its results at least in part by solving Schrodinger's equation based on positions and types of atoms. Other examples of first principles tools that can be included in the API include EPM (Empirical Pseudo-potential Method) tools, and ETB (Empirical Tight Binding) tools, and combinations of tools.

A number of modules are provided in the API in order to support the management of these intensive mathematical computations in a manner that can improve the utilization of data processing resources, improve the accuracy of the results, and reduce the time required for generating useful results.

The supporting modules include module 820 to parameterize the molecular dynamics modules. These modules can compute or optimize input parameters which can be part of the parameter sets {Y} and {A}. In some examples, the module 820 can be used to coordinate utilization of a DFT module 811 to produce an input such as an initial configuration of atoms and defects to be used in a molecular dynamics computation.

Also, module 821 is used to manage the results of the molecular dynamics computations, for example by compiling results and processing the results so that they can be utilized in following stages by other modules in the API. In some examples, the module 821 can be used to translate configurations of atoms and total energy calculations produced using molecular dynamics computations in the modules 810 into input parameters that define the starting conditions of DFT computations in the modules 811.

Module 822 can be executed to develop efficient sample spaces for the DFT or molecular dynamics modules. In some examples, the module 822 can perform sensitivity analysis to define regions in the input sample space of one computation, such as a DFT computation module 811, in which parameters (for example one of the parameters in the parameter set {A} or in the parameter set {E}) being computed have greater sensitivity to changes in input values. Using this information, a sample space can be configured for greater density across the input parameter space (for example one of the variables in the parameter set {X}) of computations in the regions of higher sensitivity than in the regions of lower sensitivity.

Module 823 is used to manage the results of the DFT computations, including compiling results and processing the results so that they can be utilized in following stages by other modules in the API. In some examples, module 823 can be utilized to translate the results of a DFT computation from module 811 into an initial condition for a molecular dynamics computation.

Module 824 can compute or optimize input parameters that can be part of the parameter set {X}.

Module 825 can be used to check or verify results generated using the atomistic scale and device scale computations, and assist in making or verifying determinations about the likelihood that further computations can lead to better results.

Figure 2:
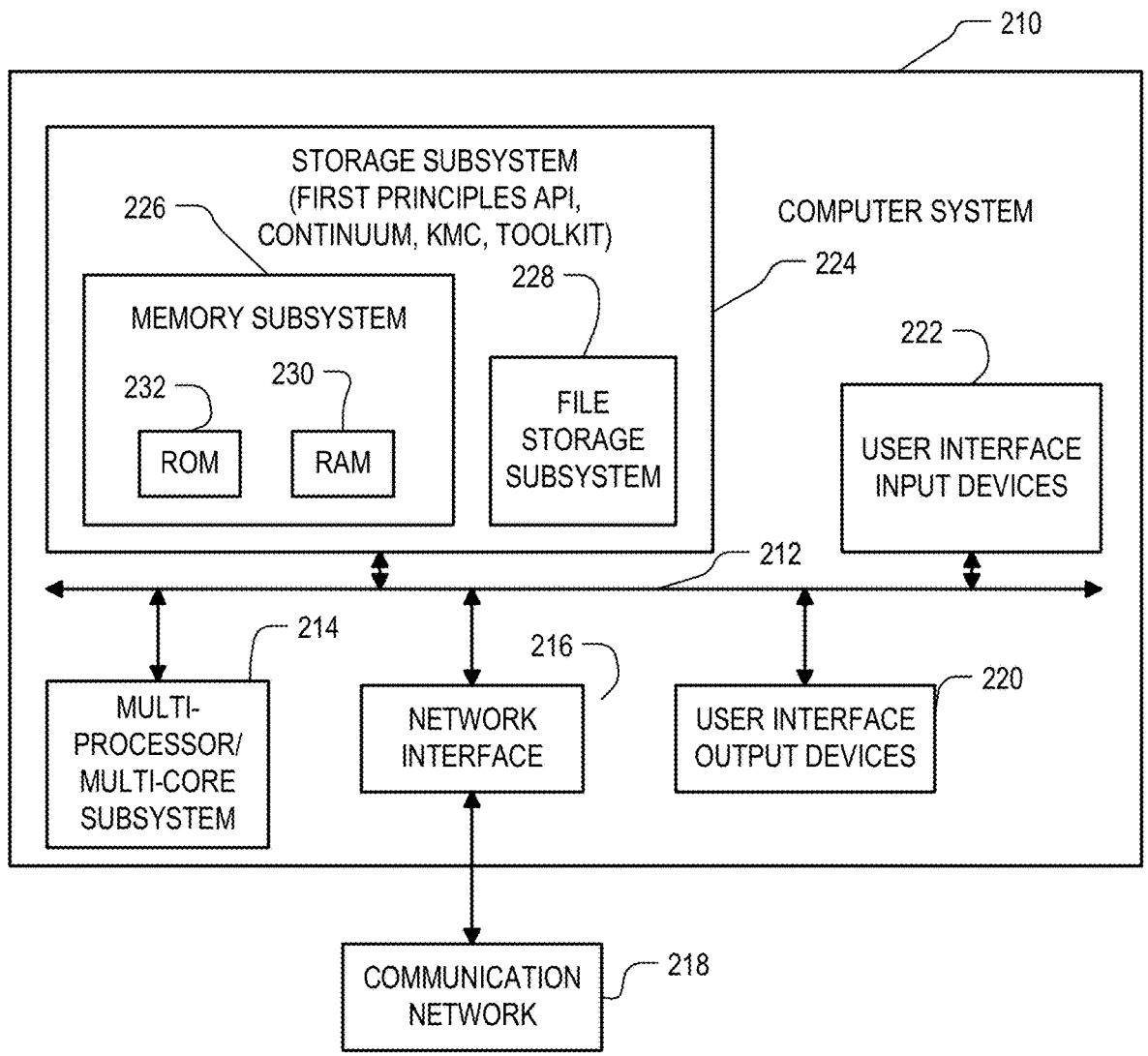
FIG. 2 illustrates a high-capacity computer system configured as an electronic design automation tool including an application program interface as described herein.

FIG. 2 is a simplified block diagram of a high capacity computer system 210 that can be used to implement the API of FIG. 1, and any of the methods and processes herein, alone or in combination. For example, the API, the procedures deploying first principle calculations, including DFT and molecular dynamics calculations, and procedures deploying the KMC and continuum calculations and other modules described with reference to FIG. 1 can be implemented with one or more programs executing on one or more computer systems 210.

Computer system 210 typically includes a processor subsystem 214 which communicates with a number of peripheral devices via bus subsystem 212. The processor subsystem 214 can include a network of computers, one or more multicore processors, and other configurations for high intensity data processing. The peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information, but typically it is an IP-based communication network. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 210 to the user or to another machine or computer system.

Storage subsystem 224 stores the basic programming and data constructs that provide the functionality of certain embodiments of the present invention, including an application programming interface that includes sets of parameters and procedures as described herein. For example, the various modules implementing the functionality of certain embodiments of the invention may be stored in storage subsystem 224. For example, the data store 110 illustrated in FIG. 2 can be implemented by one or more storage subsystems 224. These software modules are generally executed by processor subsystem 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 228. The host memory subsystem 226 contains, among other things, computer instructions which, when executed by the processor subsystem 214, cause the computer system to operate or perform functions as described herein. As used herein, processes and software that are said to run in or on "the host" or "the computer," execute on the processor subsystem 214 in response to computer instructions and data in the host memory subsystem 226 including any other local or remote storage for such instructions and data.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Due to the ever changing nature of computers and networks, the description of computer system 210 depicted in FIG. 2 is intended only as a specific example for purposes of illustrating the preferred embodiments of the present invention. Many other configurations of computer system 210 are possible having more or less components than the computer system depicted in FIG. 2.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Figure 3:
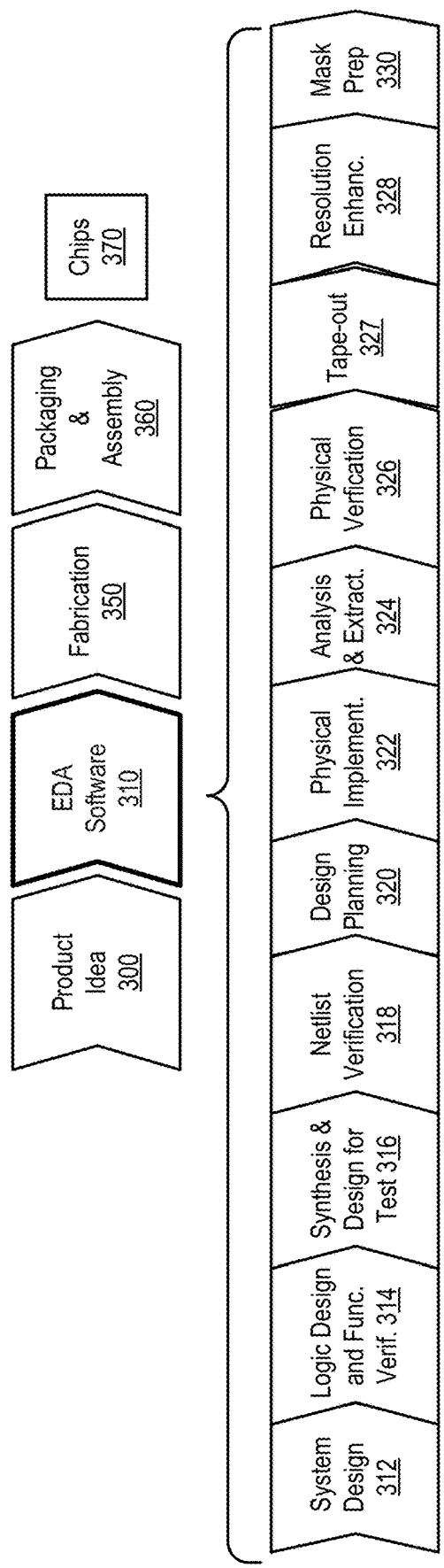
FIG. 3 shows a simplified representation of an illustrative integrated circuit design flow in which first principles simulation modules can be utilized.

Aspects of the invention comprise an electronic design automation tool in support an integrated circuit design flow. FIG. 3 shows a simplified representation of an illustrative digital integrated circuit design flow. At a high level, the process starts with the product idea (module 300) and is realized in an EDA (Electronic Design Automation) software design process (module 310). When the design is finalized, it can be taped-out (module 327). At some point after tape out, the fabrication process (module 350) and packaging and assembly processes (module 360) occur resulting, ultimately, in finished integrated circuit chips (result 370).

The EDA software design process (module 310) is itself composed of a number of modules 312-330, shown in linear fashion for simplicity. In an actual integrated circuit design process, the particular design might have to go back through modules until certain tests are passed. Similarly, in any actual design process, these modules may occur in different orders and combinations. This description is therefore provided by way of context and general explanation rather than as a specific, or recommended, design flow for a particular integrated circuit.

A brief description of the component modules of the EDA software design process (module 310) will now be provided.

System design (module 312): The designers describe the functionality that they want to implement, they can perform what-if planning to refine functionality, check costs, etc. Hardware-software architecture partitioning can occur at this stage. Example EDA software products from Synopsys, Inc. that can be used at this module include Model Architect, Saber, System Studio, and DesignWare® products.

Logic design and functional verification (module 314): At this stage, the VHDL or Verilog code for modules in the system is written and the design is checked for functional accuracy. More specifically, the design is checked to ensure that it produces correct outputs in response to particular input stimuli. Example EDA software products from Synopsys, Inc. that can be used at this module include VCS, VERA, DesignWare®, Magellan, Formality, ESP and LEDA products.

Synthesis and design for test (module 316): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this module include Design Compiler®, Physical Compiler, DFT Compiler, Power Compiler, FPGA Compiler, TetraMAX, and DesignWare® products.

Netlist verification (module 318): At this module, the netlist is checked for compliance with timing constraints and for correspondence with the VHDL/Verilog source code. Example EDA software products from Synopsys, Inc. that can be used at this module include Formality, PrimeTime, and VCS products.

Design planning (module 320): Here, an overall floor plan for the chip is constructed and analyzed for timing and top-level routing. Example EDA software products from Synopsys, Inc. that can be used at this module include Astro and Custom Designer products.

Physical implementation (module 322): The placement (positioning of circuit elements) and routing (connection of the same) occurs at this module, as can selection of library cells to perform specified logic functions. Example EDA software products from Synopsys, Inc. that can be used at this module include the Astro, IC Compiler, and Custom Designer products.

Analysis and extraction (module 324): At this module, the circuit function is verified at a transistor level, this in turn permits what-if refinement. Example EDA software products from Synopsys, Inc. that can be used at this module include AstroRail, PrimeRail, PrimeTime, and Star-RCXT products.

Physical verification (module 326): At this module various checking functions are performed to ensure correctness for: manufacturing, electrical issues, lithographic issues, and circuitry. Example EDA software products from Synopsys, Inc. that can be used at this module include the Hercules product.

Tape-out (module 327): This module provides the "tape out" data to be used (after lithographic enhancements are applied if appropriate) for production of masks for lithographic use to produce finished chips. Example EDA software products from Synopsys, Inc. that can be used at this module include the IC Compiler and Custom Designer families of products.

Resolution enhancement (module 328): This module involves geometric manipulations of the layout to improve manufacturability of the design. Example EDA software products from Synopsys, Inc. that can be used at this module include Proteus, ProteusAF, and PSMGen products.

Mask data preparation (module 330): This module provides mask-making-ready "tape-out" data for production of masks for lithographic use to produce finished chips. Example EDA software products from Synopsys, Inc. that can be used at this module include the CATS® family of products.

The integrated circuit manufacturing flow includes a parallel flow, as follows:
  (1) Develop individual process modules for manufacturing the integrated circuit. This can be modeled with EDA tools such as the Synopsys, Inc. tools "Sentaurus Process," "Sentaurus Topography," and "Sentaurus Lithography". The input information here includes the materials of the device being simulated, the process conditions like temperature, reactor ambient, implant energy, etc. The output information is the change in geometry or doping profiles or stress distribution. For example, the procedures in KMC and continuum modules 813 and 814 illustrated in FIG. 1 can be implemented using the Sentaurus Process tools. Also the module 812 of the API in FIG. 1 can be used to provide physical, device scale parameters for Sentaurus Process tool. In the current technology, this input requires specification of the materials to be utilized in the device and during the process modules. The data processing systems described herein based on first principles calculations can be applied to provide at least some of the needed material specifications.
  (2) Integrate the individual process modules into the complete process flow. This can be modeled with EDA tools such as the Synopsys, Inc. tool "Sentaurus Process." The input information here is the collection of the process modules in the appropriate sequence. The output is the geometry, the doping profiles, and the stress distribution for the transistors and the space in between the transistors. In the current technology, this input requires specification of the materials to be utilized in the device and during the process modules. The data processing systems described herein based on first principles calculations can be applied to provide at least some of the needed material specifications.
  (3) Analyze performance of the transistor manufactured with this process flow. This can be done with EDA tools such as the Synopsys, Inc. tool "Sentaurus Device." The input information here is the output of module (3) and the biases applied to transistor terminals. The output information is the currents and capacitances for each bias combination. In the current technology, this input requires specification of the materials to be utilized in the device and during the process modules. The data processing systems described herein based on first principles calculations can be applied to provide at least some of the needed material specifications.
  (4) If necessary, modify the process modules and the process flow to achieve the desired transistor performance. This can be done iteratively by using tools such as the Synopsys, Inc. tools mentioned above.

Figure 4:
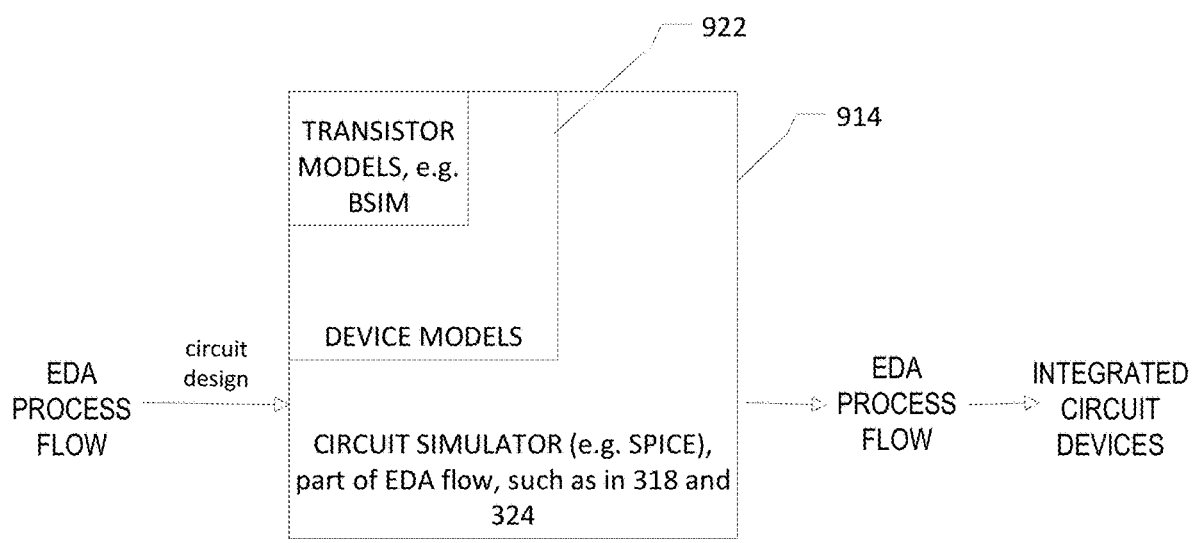
FIG. 4 illustrates a parallel design flow involved in integrated circuit design which can include the use of electronic design automation tools based on first principles calculations as described herein.

Once the process flow is ready, it can be used for manufacturing multiple circuit designs coming from different fabless companies. The EDA flow 312-330 will be used by such fabless companies. The parallel flow described here can be used at a foundry to develop a process flow that can be used to manufacture designs coming from their fabless customers. A combination of the process flow and the mask preparation 330 are used to manufacture any particular circuit.
  (5) There is also a bridge between these tools and the 312-330 EDA tools. The bridge can be an EDA tool such as a Synopsys, Inc. tool "Seismos" that applies compact proximity models for particular circuit design and layout to obtain netlist with instance parameters for each individual transistor in the circuit as a function of its neighborhood and stress, including material conversion stress.
  (6) Circuit simulators are well known. Examples of such tools are different versions of SPICE, described in the following documents incorporated by reference herein: Nagel and Pederson, SPICE (Simulation Program with Integrated Circuit Emphasis), EECS Department, University of California, Berkeley (1973) (available at http: (slash)(slash) www.eecs.berkeley.edu/Pubs/TechRpts/1973/ERL-382(dot)pdf, visited Feb. 10, 2013); Nagel, Laurence W., SPICE2: A Computer Program to Simulate Semiconductor Circuits, EECS Department, University of California, Berkeley (1975) (available at http:(slash)(slash)www.eecs.berkeley.edu/Pubs/TechRpts/1975/ERL-520(dot)pdf, visited Feb. 10, 2013); and Quarles, Thomas L., Analysis of Performance and Convergence Issues for Circuit Simulation, EECS Department, University of California, Berkeley (1989) (available at http:(slash)(slash) www.eecs.berkeley(dot)edu/Pubs/TechRpts/1989/ERL-89-42(dot)pdf, visited Feb. 10, 2013), all incorporated by reference herein. Roughly described, a circuit simulator takes a circuit design as input (typically in the form of a netlist, indicating each component of the circuit and the network by which they are interconnected), and calculates a variety of kinds of information about the circuit.
  (7) In the embodiment of FIG. 4, the circuit simulator 914 is used for example in modules 318 and/or 324 of the typical EDA flow in FIG. 2 discussed herein.
  (8) Circuit simulators such as SPICE include device models 922, which model the behavior of the various components that are used in a circuit. One example device model which is commonly used for transistors is the Berkeley Short-channel IGFET Model (BSIM) family of models. The BSIM4 version of the model is described for example in Mohan V. Dunga et al., BSIM4.6.0 MOSFET Model User's Manual, Department of Electrical Engineering and Computer Sciences, University of California, Berkeley (2006), incorporated by reference herein. The device model 922 incorporates electrical parameters generated by tools of the parallel flow such as Sentaurus Device described herein.

Figure 5:
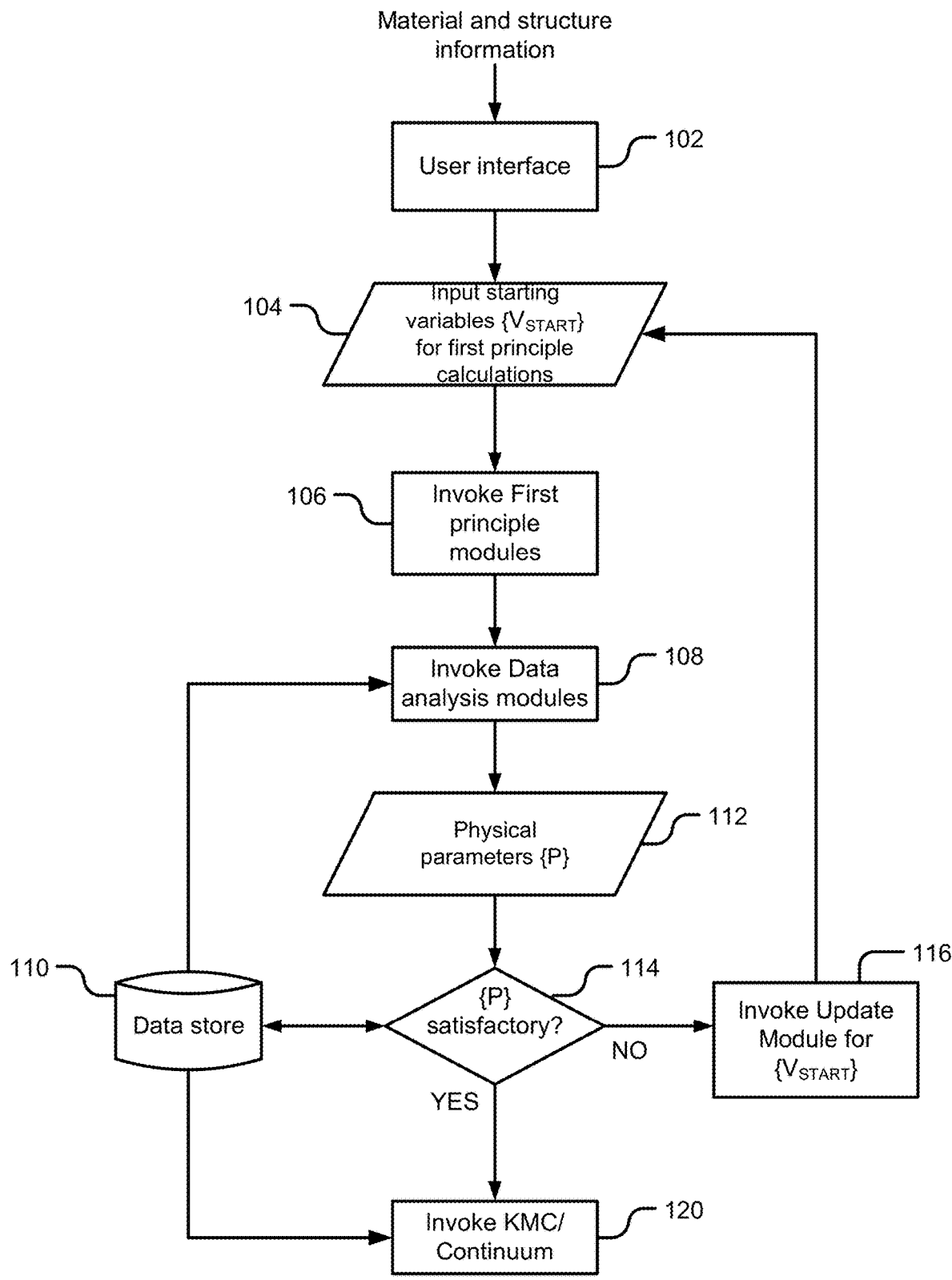
FIG. 5 illustrates a procedure which can be part of the API described above, which includes a ground truth process for evaluating the results of first principles calculations.

FIG. 5 is a flow chart of a data processing method executable by an EDA tool which utilizes first principles calculations and extracts physical parameters from results of the first principles calculations. This procedure can be implemented using modules 810, 811 and 812 for example of the API of FIG. 1. The method includes modified ground truth operations to conserve computing resources while achieving results more likely to be correct. The method starts at Module 102. At Module 102, the tool receives input for the tool from a user at the user interface of the tool.

The input for the tool includes material information such as composition. For example, the user can specify a material $Si_{1-X}Ge_X$ composes of X % of Germanium and (1−X) % of silicon. The input for the tool can also include crystal structure information for the material to be modeled by first principles calculations. For example, a defect consisting of a particular interstitial configuration for selected atoms in a host crystal can be specified using a list of N+1 vectors specifying the locations of all the N host crystal atoms and the location of the interstitial defect.

The user interface can be a command line or a graphical user interface. The user can also provide input to the tool using a batch file including commands and parameters such as an input file for the tool.

In response to, or using, the user's input, the tool determines a starting set of input parameters $\{V_{START}\}$ for first principle calculations (Module 104). In the event that the user input does not include all parameters needed by a modeling operation, the tool can execute procedures to estimate valid inputs to supplement those provided by the user. For example, the tool input parameters $\{V_{START}\}$ for first principles calculations include structure information such as primitive cell and cell size (the number of cells or the number of atoms), as well as k-points, and cut-off energy. The tool also applies, or selects and applies, a suitable approximation class for exchange-correlation energy functional in DFT such as local-density approximation (LDA), generalized-gradient approximation (GGA), or hybrid functional. The tool also applies, or selects and applies, other suitable configurations in meta-stable defects and pseudo potentials.

The tool then executes first principle calculations (Module 106), such as DFT relaxation processes to find low energy configurations for the defect. One example program for first principle calculations is The Vienna Ab initio Simulation Package (VASP) developed by faculties of Computations Physics, Universitat Wien in Austria.

After the first principle calculations are completed, the tool retrieves and analyzes results of the first principle calculations (Module 108).

The results of the first principle calculations can include a number of result sets which include for example total energy ($E_{tot}$), electronic eigenspectrum ($\varepsilon_i$), electronic density ($\rho$), and atomic coordinates ($\{x\}$) of the structure atoms after relaxation operations, all of which may be either spin-polarized or computed with specific spin-polarized inputs for a number of final configurations.

A data analysis module is provided to extract device scale parameters such as diffusivity and interstitial concentration from the results of first principle calculations.

Given the low energy defect geometry of a particular interstitial configuration (a list of N+1 vectors specifying the locations of all the N host crystal atoms and the location of the interstitial defect) such as produced using first principle calculations, the device scale parameter interstitial concentration at temperature T is:

$$C = C_0 \exp\left(\frac{-E_f}{k_B T}\right)$$

where $E_f$ is the formation energy of the defect, defined as the difference in energies between the cell with and without the defect, and $k_B$ is Boltzman's constant.

A correction can be added to the formation energy to account for the chemical potential, $\mu_i$, of the thermodynamic reservoir of interstitial atoms (where they are coming from, physically, since they are added to the cell). For charged interstitials, another correction should be added when using a supercell with periodic boundary conditions in order to properly capture the formation energy of an isolated charged defect.

The term $C_0$ is related to the formation entropy of the defect, $C_0=\exp(S_f/k_B)$, —how much it changes the vibrational properties of the lattice and therefore how likely the particular defect is to be formed by the random shaking of the lattice. $S_f$ can be determined from the phonon density of states, $g(\omega)$, of the crystal with and without the defect. The phonon density of states is a description of the vibrational spectrum of the crystal.

The device scale parameter diffusivity can be determined in an analogous way, except the relevant formation entropy $S_f$ and energy $E_f$ terms are now determined by their values at the transition state for a particular pathway. A pathway is a series of configurations of the crystal plus interstitial atom. A low energy diffusion pathway is one that requires the least amount of energy for the interstitial atom to move from one crystal unit cell to the next. For an energy surface in configuration space the low energy diffusion pathway will pass through a saddle point.

The data analysis (Module 108) performed by the tool includes one or more of the following tasks.

(a) Perform total energy subtractions to determine convergence of first principles calculation with respect to high and low frequency Fourier expansion cutoff values and unit cell size.

(b) Perform total energy subtractions to determine formation energies, binding energies and migration energies.

(c) Perform numerical derivatives to determine elastic moduli and phonon spectrum.

(d) Perform numerical integration and projection onto atomic orbitals to determine atom-decomposed charge and spin density, which yield charges and local magnetic moments.

(e) Perform numerical derivatives of the eigenspectrum and subtractions and integrations of eigenvalues to determine effective mass and optical reflectivity and absorption, respectively.

(f) Perform integration of the eigenspectrum to determine density of states.

(g) Perform numerical derivatives and integrals of the eigenspectrum to determine electrical conductivity and Seebeck coefficient.

(h) Perform subtractions, numerical derivatives and integration of spin-polarized first principles outputs to determine magnetic response function, magnetization, spin polarized optical reflectivity and adsorption, density of states, effective mass, electrical conductivity, and Seebeck coefficient.

The tool extracts in the embodiment described physical parameters {P} for input to KMC and continuum calculations as a result of the first principles calculations. The results of first principle computations can include total energy $E_{total}$ for various configurations, lattice information, v (vibration frequency), $E_f$ (formation energy), $E_m$ (migration energy), $E_b$ (binding energy), χ (Affinity), $E_c$ (conduction band), $E_v$ (valence band), and elastic moduli.

The tool can extract physical parameters from results of the first principle calculations by exponentiating the formation, binding and migration energies to determine yield defect and cluster concentrations and defect diffusivity at a given temperature. (Module 108).

The physical parameters determined in the data analysis module 108 are stored (112).

At module 114, the tool performs a modified ground truth operation, by accessing data store 110 for known data about the material under investigation, and analyzing the results of one or both of the first principle calculations and the physical layer parameters derived therefrom based on the known data. The analysis if applied for the purposes of determining a likelihood that the calculated results are correct. The known data stored in the data store 110 includes information from publications, information about measurements made relevant to the material under investigation, and results from previously performed first principle calculations executed by the tool on the same or similar materials. The information to be utilized for the modified ground truth operation for a specific material can be provided in advance in a database accessible by the tool, and added to the data store in the tool via a user interface in advance of the computations.

At Module 114, the tool can determine whether the physical parameters {P} satisfy one or more criteria. Also, a formula which can be applied automatically to determine whether the results match the information can be set for each type of information stored and for each material under investigation. For example, a test for automatically determining whether the results match, can comprise a determination of whether the results fall within a specified range of a value stored in the data store.

One criterion can be whether the physical parameters {P} converge with respect to the input parameters {V} of the first principles calculations:

$$\frac{\delta P}{\delta V} < z$$

where z is a pre-determined threshold.

For example, the tools determine whether a change in formation energy $E_f$ with respect to a change in cell or supercell sizes or the number of atoms used in the first principles calculations is less than a specified threshold. Another criterion uses a compact model P=f(a;V) such that ideal values of P and V can be calculated once {a} are extracted by fitting N data points:

$$\sqrt{\Sigma(P - f(a;V))^2 / N} < z$$

where z is a pre-determined threshold.

The tool also examines the physical parameters {P} in comparison with the known data stored in the data store 110. For example, the tool can compare a physical parameter with a known result calculated with the same or very similar starting material composition and determine the physical parameter is satisfactory if the difference between the physical parameter and the known result is less than a specified threshold. In an alternative, the results stored in the data store 110 and the results of the computation can be presented to the user at a user interface for the tool. The user can decide based on the presented data, whether to proceed with additional computations.

If one or more of the physical parameters {P} does not satisfy the criteria, the tool then adjusts one or more of the input parameters {V} for the first principles calculations (Module 116).

For example, the tool can increase the cell or supercell size, and the number of atoms included in the first principles calculations (e.g., from 8 atoms to 64 atoms, or from 64 atoms to 216 atoms). Other inputs that can be adjusted include a k-point sampling density and a planewave cutoff energy. The tool also adjusts other configurations for the first principle calculations. For example, the tool can update the exchange-correlation energy function in DFT from LDA to hybrid functional. The tool then executes the first principles calculations and repeats the loop of Modules 104, 106, 108, 112, 114, and 116, until the extracted physical parameters {P} are satisfactory.

If the physical parameters {P} satisfy the criteria, the tool provides the physical parameters {P} as input to KMC and continuum calculations (Module 120). The tool also stores in the data store 110 the physical parameters {P} with corresponding user inputs and input variables {V} and configurations for the first principles calculations for later use.

Example data stored in the data store 110 include one or more of the outputs from the first principles calculations or data analysis modules (Modules 106 and 108), such as total energy, atomic coordinates, electronic density, spin polarized electrical conductivity, density of states, defect formation energy, and defect diffusivity. Data stored in the data store 110 can also include input variables used in the first principles calculation, such as crystal structure, unit cell size, starting electronic wave functions, and high or low frequency cutoff values for a Fourier transform.

The tool also provides feedback to the user if one or more error conditions occur. For example, the tool can provide to the user error messages generated by the first principles calculations.

In one example, a material specification includes a host crystalline structure that consists of an element or elements in the set, and an additional element, or impurity. A set of atomistic scale computations is executed, where in each computation the additional element is variously or randomly located as an interstitial in the host crystalline structure, the resulting structure is allowed to relax, and the total energy, or other energy based parameter of the relaxed structure, is determined. The set of atomistic scale computations can have results that fall into groups of matching values, possibly reflecting the quantum nature of the interstitial defects. The groups of matching values are used to identify a set of relaxed state configurations of the specified material, including interstitial defect and impurity configurations, and diffusivity and concentration parameters for such configurations. Then parameters used by higher scale simulations are generated for each configuration in the set.

The EDA tool as described herein can include an application program interface API, which comprises a set of parameters and functional modules with a specified user interface, to support multi-scale modeling processes. Functional modules in the tool can implement the technique shown generally in FIGS. 6 to 8.

The functional modules included in the tool can include atomistic scale algorithms, such as DFT algorithms, in order to characterize the material, and produce a parameter set. Also, functional modules in the tool can include the tool uses procedure that can include a classical interatomic force field function (known as MD for "molecular dynamics"), which can be derived from the literature or computed using a DFT algorithm, for example, to produce estimates of atomic configurations based on for example a minimal force configuration.

In one example, the tool uses a procedure that can include a classical interatomic force field function to produce estimates of atomic configurations based on for example a minimal force configuration. These atomic configurations can then be translated by the tool into the input format required for DFT computations, or other more accurate computational tool, which is then executed to produce a more accurate characterization of the atomic configurations. The outputs of the DFT computations are then suitable for use to produce parameters necessary for higher scale simulations.

Figure 6:
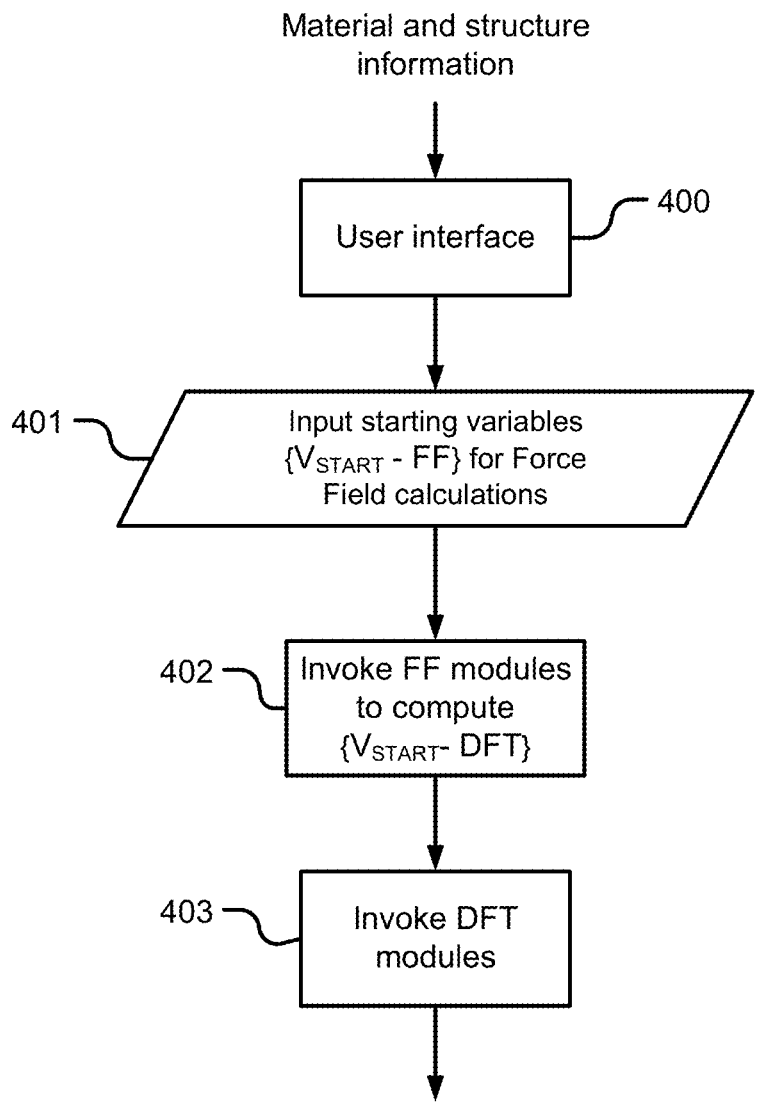
FIG. 6 illustrates a procedure which can be part of the API described above, in which classical interatomic force field functions are used to produce estimates of atomic configurations, which can then be used as input parameters for subsequent DFT computations.

FIG. 6 illustrates the basic process flow. Beginning with material and structure information of the material which the user desires to simulate, a user interface is set up by module 400. Starting variables {VSTART-FF} for interatomic force field functions, such as molecular dynamics functions, are provided to the system using the user interface at block 401. Next, the interatomic force field computations are executed by module 402 to produce a preliminary set of input variables {VSTART-DFT} to be utilized as the starting variables for the DFT algorithm. Then, in module 403, the DFT calculations are executed.

In one example, the material specification provided through the user interface at module 401 includes a host crystalline structure that consists of an element or elements in the set, and an additional element, or impurity. A set of atomistic scale computations is executed, using a first procedure to identify a preliminary set of configurations, where the additional element or elements are variously located as an interstitial or other defect in the host crystalline structure. Then a set of atomistic scale computations is executed, using a second procedure such as DFT computations, using the preliminary set of configurations as starting parameters. In the second procedure, the structure identified by one of the preliminary set of configurations is allowed to relax, and the total energy, or other energy based parameter of the relaxed structure, is determined. These results can be translated by the tool into parameters of the specified material used by higher scale simulations.

Also, the design tool can include a procedure for simulation of a structure that includes the specified material, or of a process involving the specified material, using algorithms that use the parameters generated.

Figure 7:
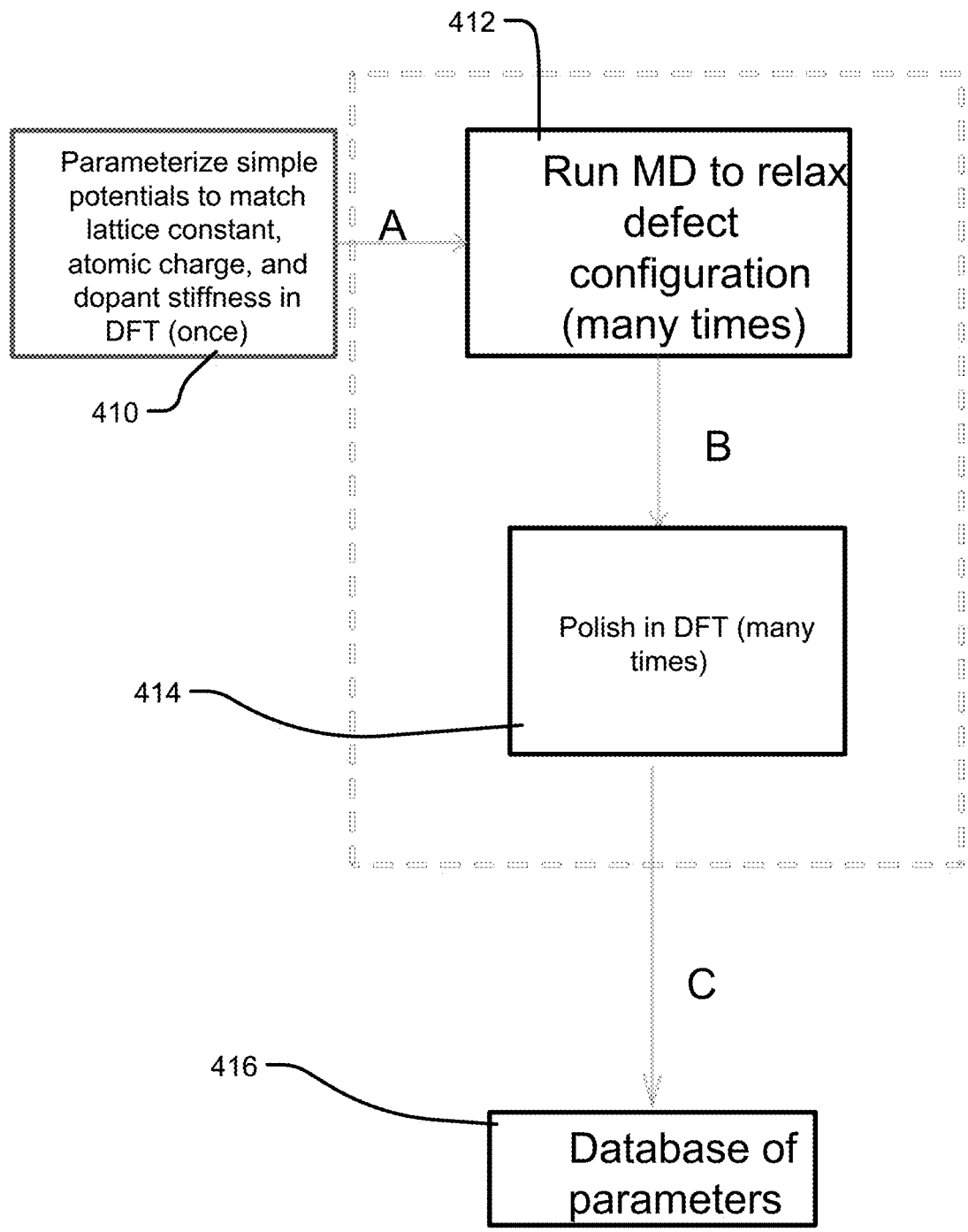
FIG. 7 illustrates an embodiment of a procedure which can be included in the API described above, which is an example of a procedure like that of FIG. 6.

FIG. 7 shows a flow diagram of an embodiment of procedures executed by a tool as described herein, including simulation procedures that include DFT computations. In a first module (410), simple potentials are parameterized to match the lattice constant, atomic charge, and dopant stiffness using a DFT computation. This can be accomplished in one DFT computation for some candidate materials. The module 410 takes as input the input special quasi-random structures SQSs, the elemental species, and some doping sites, and runs a DFT in relatively small cells to generate the potentials. The potentials can be the Tersoff type, Coulomb type, Morse type and others. The parameters can be changed to match the DFT derived lattice constant, atomic charge and dopant stiffness. The scripts also estimate the total time required for the calculation and a list of the calculations to be performed. It will be used to generate inputs for the DFT and the molecular dynamics functions, once the potentials are computed. In module 412, a molecular dynamics function, such as a commercially available Large-scale Atomic/Molecular Massively Parallel Simulator LAMMPS, is executed many times to produce relaxed geometries for the material.

The output specifying the relaxed geometries can then be translated into the input file for a DFT computation. In module 414, the DFT computation is executed many times to produce final relaxed geometries. These relaxed geometries are then parsed to calculate continuum model and KMC model parameters for storage in the database 416.

The algorithm is composed of two distinct modules among others. In the first module one or more force minimization (relaxation) modules are carried out using the classical interatomic force field computations. In the second module further force minimization is carried out using DFT computations.

The two modules in the dashed box are the interatomic force field relaxation followed by the final relaxation in DFT.

In the first procedure, a method (such as conjugate gradient, steepest descent or Broyden-Fletcher-Goldfarb-Shanno algorithm BFGS) is used to iteratively adjust the positions of all the atoms in some system (i.e., host, defect, or unit cell) of interest in order to progressively decrease the total force acting on the atoms. When the change in force is less than some specified threshold, the algorithm stops and the final positions of the atoms in the minimal force configuration are stored in memory. Next a script is executed to translate these positions into the DFT input format and a DFT relaxation is carried out. Because the DFT is more accurate, this relaxation will typically further reduce the forces computed in DFT on the atoms to arrive at a final more fully relaxed structure. Because only the final portion of the calculation is typically carried out in the DFT mode, the overall search for the relaxed structure is more efficient.

The method can be extended to search for pathways, or sets of defect configurations, that minimize some objective function defined along the pathway.

SQSs are special quasi-random structures that allow efficient calculations in alloy materials. The process can simulate a random alloy crystal—like $Si_xGe_{1-x}$—using a periodic supercell, which is inherently ordered. The supercell has the appropriate concentration of Si and Ge atoms corresponding to the mole fraction, x, and a specific arrangement of the atoms on the lattice sites. This arrangement is the one whose n-point correlation functions have the best agreement with the n-point correlation functions of the random alloy, for short distances and small n. The two point correlation function takes as input a distance and a particular arrangement of atoms on a crystal lattice and produces as output a number proportional to the probability that two atoms in the crystal separated by the input distance are the same species. The definition can be generalized to the n-point correlation function—it produces a probability that n-atoms separated by an aggregate distance are all of the same type. All correlation functions are determined exactly for the random alloy by definition—all truly random alloys have the same set of correlation functions. The SQS is that particular arrangement of alloy atoms on the lattice that most closely resembles the random alloy, locally. It is a tool that allows one to model random alloy properties without having to do an expensive ensemble averaged over many different configurations.

A Large-scale Atomic/Molecular Massively Parallel LAMMPS simulator, which is commercially available, can be used for computations of force field relaxation, for example.

A classical interatomic potential function for the atoms of interest is a function specifying the forces on atoms due to the configuration of all the other atoms in the system. Many such interatomic functions of varying complexity and accuracy are freely available. In situations where force fields for all species are not available, a preliminary parameterization of the interatomic force function may be utilized.

Figure 8:
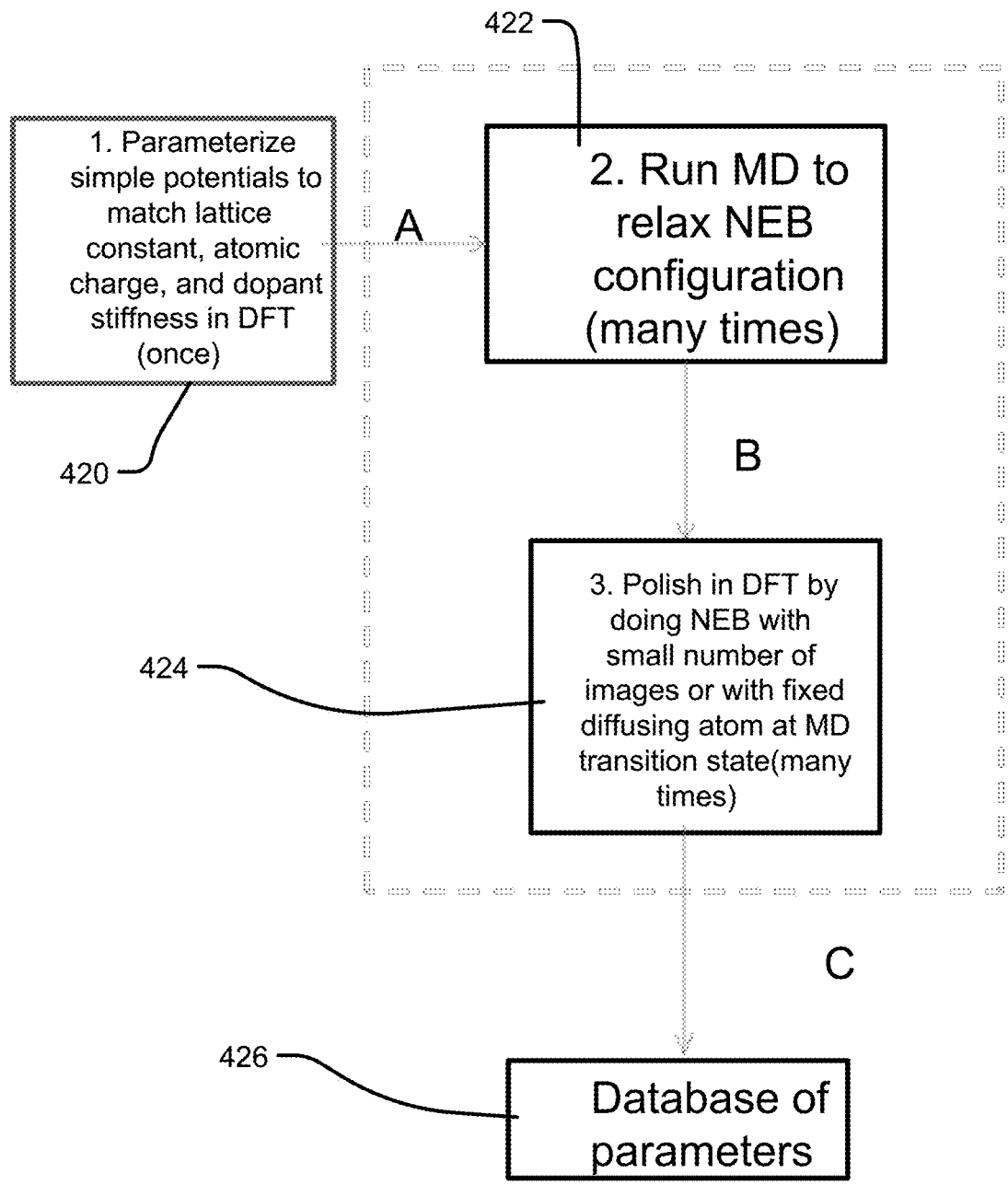
FIG. 8 illustrates another embodiment of a procedure which can be included in the API described above, which is an example of a procedure like that of FIG. 6.

FIG. 8 illustrates how extension could be made to, for instance, the nudged elastic band (NEB) method. In a first module (420), simple potentials are parameterized to match the lattice constant, atomic charge, and dopant stiffness using a DFT computation. This can be accomplished in one DFT computation for many materials. The module 420 takes as input the input SQSs, the elemental species, and some doping sites, and runs a DFT in relatively small cells to generate the potentials. The potentials can be the Tersoff type, Coulomb type or Morse type for example. The parameters can be changed to match the DFT derived lattice constant, atomic charge and dopant stiffness. The scripts also estimate the total time required for the calculation and a list of the calculations to be performed. It will be used to generate inputs for the DFT and the molecular dynamics functions, once the potentials are computed. In module 422, the molecular dynamics model is executed many times to produce relaxed ENB configurations for the material. The output specifying the relaxed geometries can then be translated into the input file for a DFT computation. In module 424, the DFT computation is executed many times using the NEB function with a small number of images, or with fixed diffusing atoms, at the molecular dynamics determined transition state. The final results are then parsed to calculate continuum model and KMC model parameters for storage in the database 426.

In multiscale modeling using density functional theory calculations, it is desirable to accurately identify the atomic configurations that are associated with low energy defects and transition states. Density functional theory (DFT) calculations using these atomic configurations can provide accurate estimates of formation energies and migration energies, as well as other physical quantities, that can be used to parameterize more computationally efficient higher level modeling tools. The identification of the specific low-energy configurations in DFT can be time consuming and costly because they are not known a priori and typically must be searched for using some algorithm. The tool described here executes a method to dramatically speed up such searches using a combination of classical interatomic force field computations and DFT computations. Interatomic force field computations can include computations using algorithms referred to as molecular dynamics MD, and computations using algorithms referred to as tight binding TB, and computations using algorithms referred to as non-equilibrium Greens functions NEGF. By using the force field computations to begin the search, many of the expensive DFT computations can be skipped.

This method identifies saddle points and associated migration pathways for diffusion in solids by minimizing the potential energy of a fictitious elastic band stretching through configuration space from an initial to a final atomic configuration. The potential energy is defined as the total energy of each configuration along the pathway. By carrying out the majority of the transition state search using the interatomic force field and changing at the end to the accurate DFT, much computation time and resources can be saved. The final DFT calculation can be a full NEB calculation starting from the configurations determined with MD or simply a constrained relaxation about the transition state configuration. The constraint would be to fix the position of the diffusing atom at or nearby the transition state configuration identified with the less accurate method.

The method here drastically reduces the computational resources required to arrive at low energy atomic defect configurations in situations when there is little prior knowledge of the configuration. Because sophisticated multiscale modeling parameterization procedures for new materials typically can require thousands of defect configuration energies, this method can make such large scale calculations practical. The usual sacrifice in accuracy is avoided using the technology described here by using a high accuracy polish module in DFT, after utilizing interatomic potential based systems, like molecular dynamics modules, or other models that are less resource intensive that the DFT. Also, the usual sacrifice in accuracy when using interatomic potentials is avoided by bookending the low accuracy search with a high accuracy initial parameterization and with a single high accuracy polish module in DFT.

The EDA tool as described herein can include an application program interface API, which comprises a set of parameters and functional modules with a specified user interface, to support multi-scale modeling processes. One or more functional modules can be provided which implement the technique shown generally in FIGS. 9-14.

The technique is executed in the context of using two different models of the same physical system, one a more detailed quantum mechanical model such as DFT and one a simpler effective classical model such as a MD model, or even a model operating at a device scale, such as a KMC model or continuum model. The detailed model is used to provide parameters to the simpler model, with appropriate mapping and processing of the outputs to match the required input or inputs for the simpler model. A system is proposed that configures the procedures to use the detailed model more often when it provides parameters that vary a lot and to use it less often when the parameters it provides do not vary as much.

The benefits of the technique include allowing one to use the more costly detailed model when it is needed and not use it as much when it is not needed. Without this technique, modeling a physical system with more than one model would often spend much more time than was needed using the detailed model, but perhaps still fail to effectively use it at certain times. This technique automatically optimizes the way the detailed model provides information to the simpler model so both models are efficiently coupled.

Figure 9:
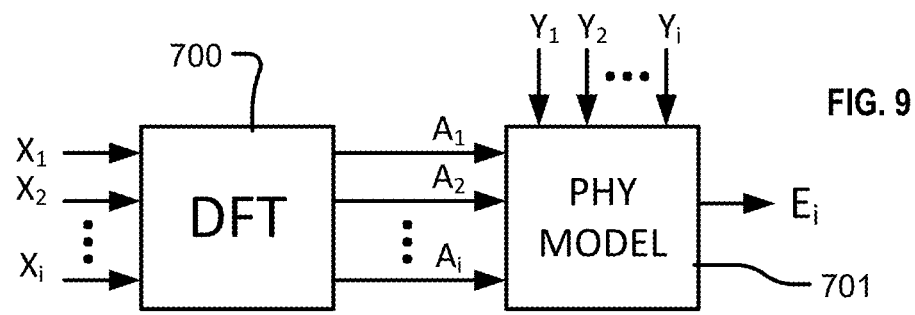
FIGS. 9, 10, 11, and 12 illustrate a procedure which can be used to apply a sensitivity analysis to the parameter space used as inputs to first principles computations.

FIG. 9 illustrates a detailed model, e.g. DFT module 700, and a simple model, e.g. device scale physical module 701. The detailed model takes as input a set of values $\{x\}$ and produces a set of outputs $\{A(\{x\})\}$. The curly brackets denote a set, e.g. $\{A\}=\{A1, A2, \ldots An\}$ and the parentheses denote a function that associates a set of outputs to each set of inputs. The simpler model takes an input set $\{y\}$ and produces an output set $\{E(\{y\})\}$. The purpose of the entire calculation is to evaluate $\{E\}$ over a range of inputs $\{y\}$. The function producing $\{E\}$ from the $\{y\}$ is specified by a set of parameters $\{A\}$. These parameters $\{A\}$ are implicit functions of $\{y\}$ because there is a correspondence between the inputs to the simple function and the detailed function: {y}← →{x}. This means the parameters {A} in the simple model should change depending on which {y} is chosen.

One could evaluate the functions {E{y}} for various y's by simply associating to each {y} a set of detailed model inputs, {x}, using the above correspondence between {x} and {y}, and then execute the detailed model on these {x} to produce a set of parameters {A}, followed by an evaluation of the simple model with inputs {y} and parameters {A}. However, evaluations of the detailed model are costly, so one wishes to minimize them. Unless one wishes to use the same values of {A} for every set of simple model inputs {y}, some detailed model evaluations typically are necessary to determine the appropriate values of the parameters {A} in different regions of the space of inputs {y}.

The system for deciding begins by executing the detailed model for several sets of detailed model inputs {x} to produce values {A}. These sets may be on a regular grid in x-space or a non-regular grid. Then a series of simple model evaluations (e.g., a 'simulation') are carried out to determine the outputs {E} for input sets {y}. After each simple model evaluation, additional supplementary simple model evaluations are carried out with identical inputs {y} but parameter values {A} changed by a vector {ΔA}.

Figure 10:
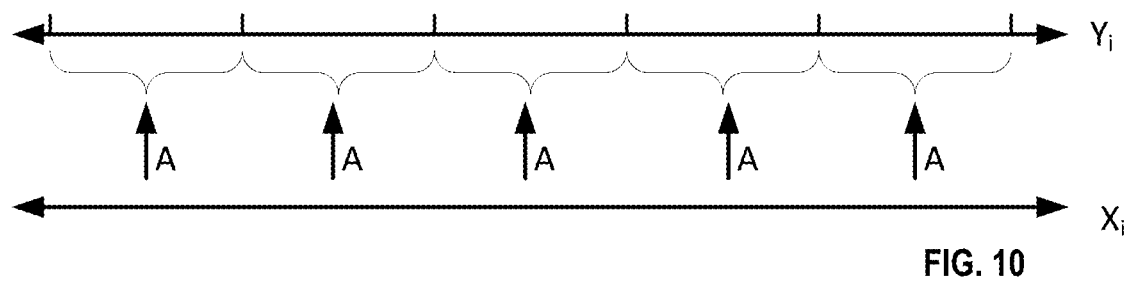

FIG. 10 shows a regular sampling of the spaces of inputs {x} and {y}. The upper axis represents the space of inputs {y} and the lower axis represents the space of inputs {x}. The correspondence between {x} and {y} aligns the two spaces. The indexed regions in the y-space are associated with a single point in the x-space where the parameters {A} are determined.

An example of the technique is a case in which the detailed model is a density functional theory (DFT) algorithm, taking as inputs the atomic coordinates of atoms, {$x_i$} and producing as outputs any combination of: the forces on the atoms, {$F_i$}; the velocities of the atoms, {$v_i$}; the hopping probability between pairs of atoms for electrons with energy E, {$t_{ij}(E)$}; the magnetic moments on the atoms, {$m_i$}; the energy levels of the system at different electron wavelengths, k, {$E_{ik}$}; the total energy of the system, {$E_{total}$}; the elastic moduli, {$dE_{total}/dV$}; the phonon spectrum of the system, {ωk}; the optical response of the system, the Kohn-Sham wavefunctions of the electrons, {ψi}; or the electronic density field, ρ.

The simpler model could be one of either classical molecular dynamics (MD), continuum model, non-equilibrium Green's functions transport model (NEGF), tight-binding (TB), or a kinetic or lattice Monte Carlo model (KMC or LKMC). In the cases of MD, TB, and LKMC, the inputs to the simpler model {y} are the atomic positions plus some other inputs, such as external voltage, temperature, magnetic field or pressure.

A first realization of the technique comprises of computing curvatures using numerical derivatives (using for example, a finite difference expression):

$$\frac{\partial A_i}{\partial x_j} = \frac{A_i(x_j) - A_i(x_{j+1})}{x_j - x_{j+1}}$$

Figure 11:
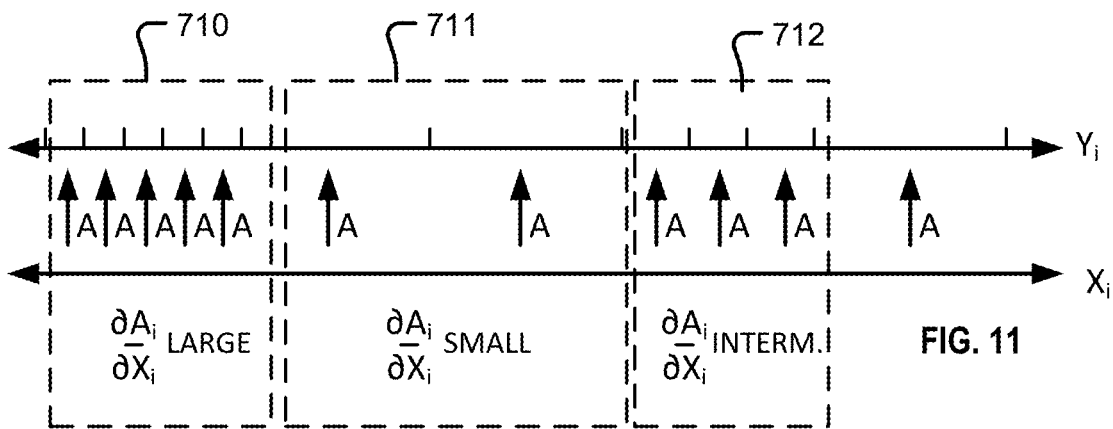

Then in regions of x-space where the curvatures are large, more evaluations are of the detailed model are carried out, either on a regular or non-regular grid in the region of large curvature. A modified sampling of the spaces of inputs {x} and {y} that can result from this realization is shown in FIG. 11. The points in x-space for which parameters A are produced are denser (e.g. in region 710) when the curvature in x-space is large. The points in x-space for which parameters A are produced are more sparse (e.g. in region 711) when the curvature in x-space is small. The points in x-space for which parameters A are produced have an intermediate density (e.g. in region 712) when the curvature in x-space is intermediate in value.

A second realization of the technique begins the same as the first: the detailed model is executed for several sets of detailed model inputs {x} to produce values {A}. These sets may be on a regular grid in x-space or a non-regular grid. Each set of detailed model inputs {x} is made to correspond to a range of input sets {y} of the simpler model. In this way simple model input sets {y} and {y}' will have the same parameter values {A} if they are nearby each other in the y-space. Curvatures are computed using for example, a finite difference expression:

$$\frac{\partial E_i}{\partial A_j} = \frac{E_i(A_j) - E_i(A_j + \Delta A_j)}{\Delta A_j}\bigg|_{\{y\}}$$

When the curvatures are greater than a certain tolerance for some input sets {y}, the number of different evaluations of the parameters {A} in the detailed model at the corresponding regions in x-space will be increased, using either a finer regular grid or a finer non-regular grid on those regions of x-space.

Figure 12:
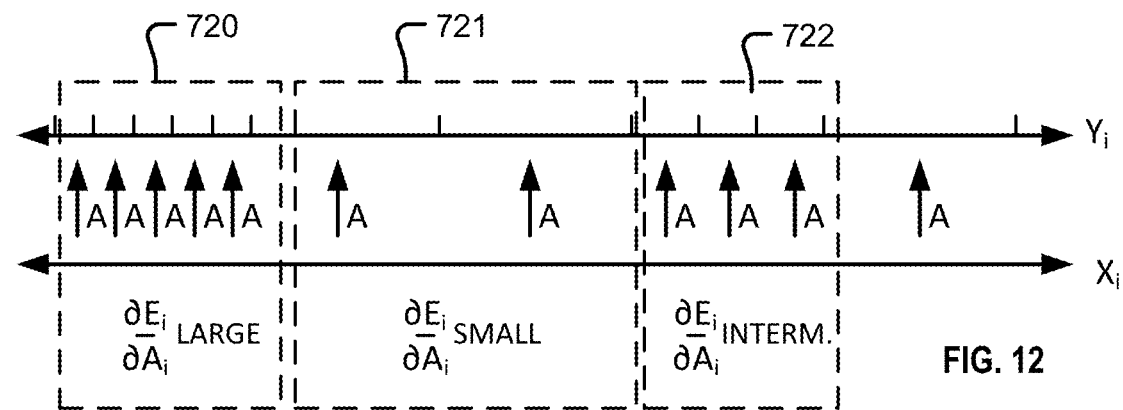

A modified sampling of the spaces of inputs {x} and {y} that can result from this realization is shown in FIG. 12. The points in x-space for which parameters A are produced are denser (e.g. in region 720) when the curvature in A-space is large. The points in x-space for which parameters A are produced are more sparse (e.g. in region 721) when the curvature in A-space is small. The points in x-space for which parameters A are produced have an intermediate density (e.g. in region 722) when the curvature in A-space is intermediate in value.

Figure 13:
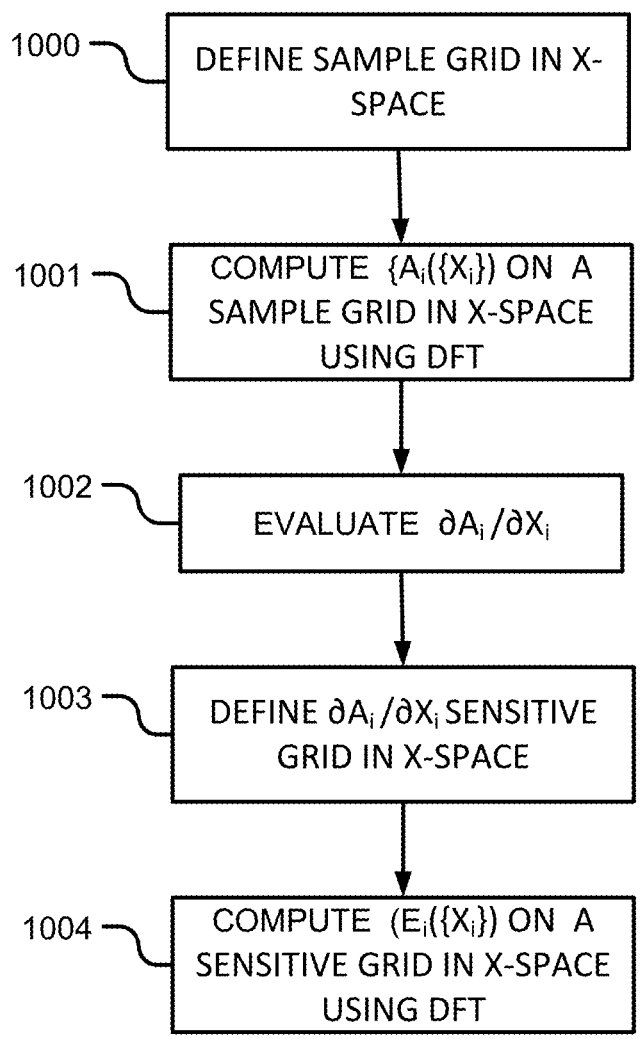
FIG. 13 illustrates one embodiment of a procedure for applying sensitivity analysis to the computation of inputs for first principles computations.

FIG. 13 is a flowchart of a procedure which can be included in the API for the EDA tool described herein implementing the first mentioned realization. The procedure includes a module for defining a sample grid in the x-space in which to produce parameters {A} (1000). This can be a technique which aligns the x and y spaces according to their correspondence, and then divides the x-space into the index regions, within which a single parameter set A is utilized. Next, the parameter set {A} is computed for the sample grid using a DFT module (1001). The results of the computation of the parameter set {A} are evaluated to define the curvature in x-space of the resulting data (1002). The module then defines a modified sample grid which is sensitive to the curvature, where the sample space is denser in regions of higher curvature, and less dense in regions of lower curvature (1003). Next, the module computes the results {E} of the second function using the parameter set {A} over the modified sample grid using the corresponding inputs {Y} (1004).

Figure 14:
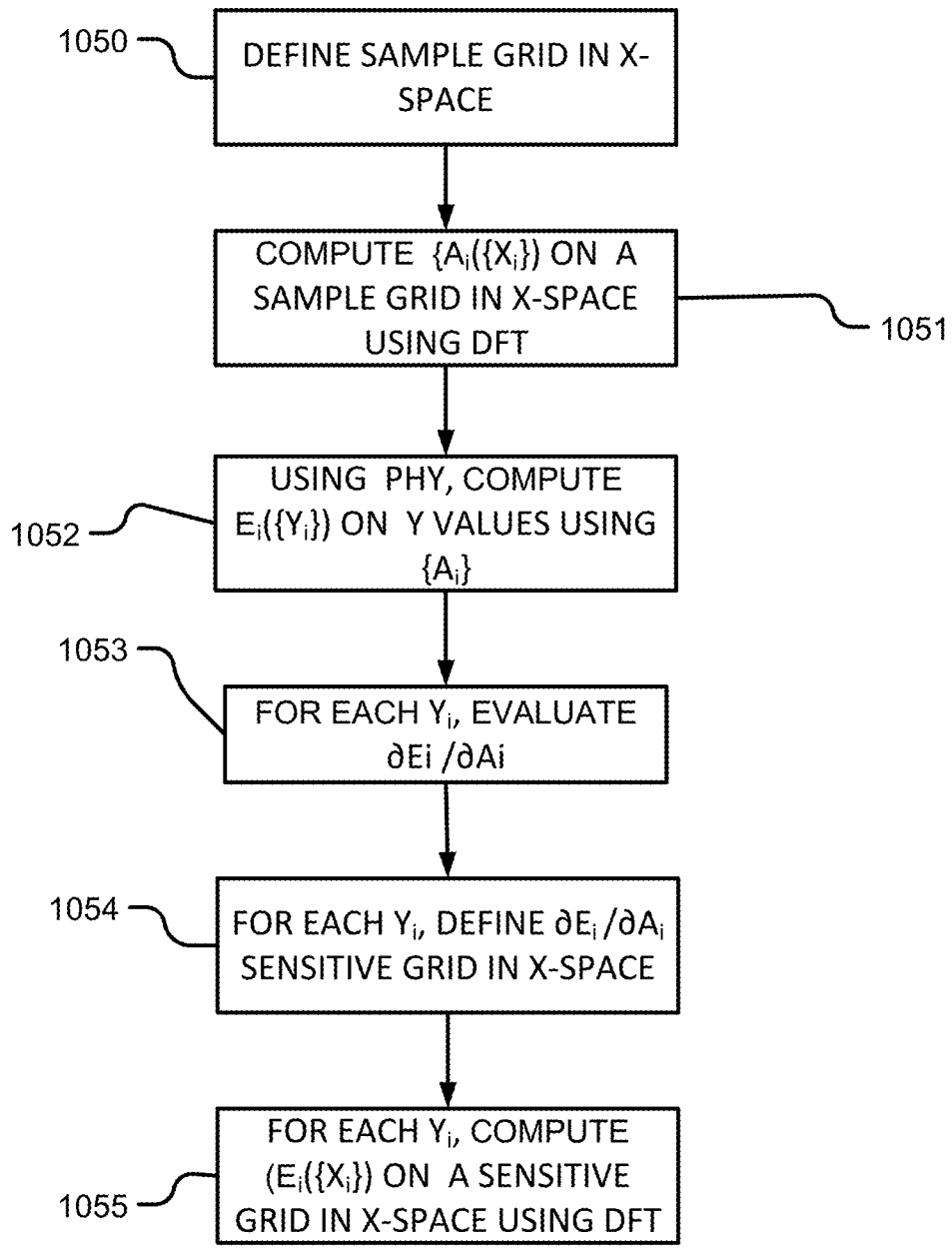
FIG. 14 illustrates another embodiment of a procedure for applying sensitivity analysis to the computation of inputs for first principles computations.

FIG. 14 is a flowchart of a procedure which can be included in the API for the EDA tool described herein, implementing the second first mentioned realization. The procedure includes a module for defining a sample grid in the x-space in which to produce the parameters {A} (1050). This can be performed as described above. Next, the parameter set {A} is computed for the sample grid using a DFT module (1051). Then according to this realization, the simpler model is used to compute the results E over the input set {Y} using the computed values for {A} on the sample grid (1052). For each value of the sensitivity of the results E to changes in the parameter values {A} is determined by defining a curvature in a-space of the resulting data (1053). Then, for each value of $Y_i$, a modified sample grid in x-space is produced which is sensitive to the curvature, where the sample space is more dense in regions of higher curvature, and less dense in regions of lower curvature (1054). Next, a new set of parameters {A} is produced using the modified sample grid in x-space using the DFT function, and then the module computes the results {E} of the second function using the parameter set {A} computed using the modified sample space (1055).

The tools described herein can include a variety of modules which support technology for comprehensively identifying the possible interstitial crystal sites for a given host crystal—impurity or host crystal—native interstitial system, which is desired because it will reduce the number of expensive atomistic calculations that are typically required to characterize the defect chemistry of a particular material in the context of multiscale process and device modeling.

The modules in various embodiments of this inventive aspect use random initial locations or thermally equilibrated simulated melts of the materials to sample the space of configurations. A dynamic relaxation process is carried out to group the configurations according to their total energy. A final geometrical analysis allows further grouping of the configurations into geometrically and energetically unique configurations which can provide valuable inputs to multi-scale modeling tool sets.

A tool is described that allows a controlled and comprehensive sampling of the possible defect configurations. Presently investigations of defect chemistries in host crystal—impurity or host crystal—native interstitial systems are done in a haphazard way by considering only a limited set of defect configurations that the investigator believes are relevant. In the context of multiscale modeling involving new materials, such a haphazard method will fail because of lack of experimental data or previous computational studies on the new material. The tool described herein can provide for more systematic approaches applicable to any crystalline material, regardless of composition. Further, the tool allows a controlled adjustment of the simulation parameters in order to capture more extended-type defects involving displacements of many host crystal atoms or to capture the most point-like defects that involve displacements of a minimal number of host crystal atoms. Such controlled adjustment is valuable because, as the temperature of the material increases, the relative importance of point-like versus extended defects changes—at low temperatures low energy point-like defects are most relevant for determining multi-scale modeling parameters such as defect concentration and migration energies, but at higher temperatures the higher energy and higher entropy extended defects may become increasingly relevant for determining the modeling parameters. The tool supports procedures to systematically identify both the point-like and extended defects, making the haphazard approach unnecessary.

One example module can determine the calculation parameters for the host crystal. An EDA tool as described herein can include procedures to provide parameters, including:

Generate supercells of different sizes of the pristine host crystal. For materials with the zincblende (ZB) of diamond crystal structure like GaAs, InP, or Si, a conventional 8-atom cell, a 64-atom cell, a 216-atom cell and a 512-atom cell are typical.

Select an XC-approximation. The Local Density Approximation LDA is the simplest and least accurate. The Generalized Gradient Approximation GGA has multiple implementations and improves accuracy modestly. Other XC-approximations will generally be more computationally expensive, but may be necessary to accurately capture certain material parameters such as band gap or magnetic moments. The Perdue-Burke-Ernzerhof PBE version of the GGA can be used for its improved accuracy compared to LDA and its widespread use.

a. Select psuedo-potentials for all the elements of interest, including host crystal and any impurity species. Generally projector augmented wave PAW can be used.
 b. Total energy calculations using the smallest cell are carried out to determine the appropriate k-point sampling mesh and the planewave cut off parameter for the host crystal. This means a series of ground state electronic densities and associated total energies are calculated, with the value of the planewave cutoffs and k-point mesh density increasing by 20% at each module. As the cutoff and mesh density increase, the change in total energy between calculations will decrease. When the change is less than a specified convergence criterion, the second-to-last cutoff or k-point mesh parameter is sufficient to reach the precision specified by the convergence criterion. A convergence criterion of 10 meV, for example, can be used. The convergence test with respect to planewave cut off and with respect to k-point mesh can be done independently with one fixed and the other varied, but we suggest checking with a final convergence test of each parameter with the other set at its nominally converged value. This means if a 10×10×10 k-point mesh and a 350 eV cutoff are independently determined, final checks first with a 12×12×12 k-point mesh and 350 eV cutoff and second with a 10×10×10 mesh and a 420 eV cutoff should be carried out. If the energy changes by more than the convergence criterion, further convergence modules with increased parameters should be carried out. Planewave cutoff convergence tests should be carried out for any impurity species using an isolated impurity atom in a large cell. The highest cutoff determined from the host crystal test and the impurity test should be used for all further calculations.
 c. If only point-like, non-extended defects are relevant to the materials parameterization no further k-point mesh convergence is required. If the materials parameters for different host crystals, heterostructures, surfaces, interfaces, or extended defects such as grain boundaries are desired, each should be treated as a new material and the k-point convergence for each independently re-determined.
 d. Given the k-point mesh density in the smallest cell, the k-point mesh density in the larger cells is determined by scaling by the inverse of the cell expansion. For example, if a 10×10×10 mesh is sufficient for convergence in an 8-atom GaAs cell, it will be sufficient to use a 5×5×5 mesh in a 64-atom cell, in which the length of one edge is twice that of the 8-atom cell edge length. In this way the k-point mesh for all supercells is specified by the k-point convergence in the smallest cell. If a non-cubic supercell is used, the mesh densities in each direction should be scaled by the corresponding cell expansion.

In some embodiments, the EDA tool described herein can include a database that stores parameter sets for the elements, crystal lattice structures, and at least some DFT parameters for corresponding materials, used with the procedures as described above for modified ground truth operations.

Once a procedure to determine the k-point and cutoff parameters for the host crystal is executed, the same parameters can also be used for point-like defect calculations in the supercells. The first module in the defect calculations is to determine the relevant defect configurations. As an example, one more or less haphazard way is to list the possible defects allowed by crystal symmetry. This approach can include the following:

a. Vacancies at each site in the primitive unit cell can be evaluated. The number of different possible vacancies is determined by the number of different sites in the primitive unit cell of the host crystal, not by the number of elements in the chemical formula. A vacancy model can be created by removing the coordinates of the atom at the vacancy site from the input file and decreasing the total number of atoms by one. A separate vacancy model should be created for each site in the primitive cell, for each supercell size. Vacancies are denoted $V_1$, where 1 specifies the site.

b. Antisite defects can be evaluated; these are defects in which an atom of the host crystal occupies the lattice site of an atom of a different element. In GaAs there are two possible antisite defects: $As_{Ga}$ and $Ga_{As}$. In this notation, $1_2$, the atom of element 1 occupies the 2 site. For crystals with more complicated structures, the number of antisite defects grows with the number of unique lattice sites, as in the case of vacancies, not the number of elements in the compound.

c. Interstitials are atoms that do not occupy a lattice site. At first blush it may appear that there are an infinite number of possible interstitial sites, since in the crystal unit cell there are an infinite number of points that are not lattice sites. However, only certain interstitial sites are energetically favorable for the interstitial atom to occupy. An atom placed at a random location in the crystal unit cell will lower its total energy by moving to one of these low energy favorable interstitial sites. The low energy interstitial sites are often, but not always, highly symmetrical, meaning the interstitial atom is equidistant from several crystal atoms. Because the low energy sites have lower energy than any other nearby sites, they are also called stable interstitial sites. The set of stable interstitial sites in a crystal depends on both the crystal and the interstitial species.

i In the ZB (GaAs) and diamond structures, there are several common interstitial stable interstitial sites that in a typical embodiment should always be considered: The tetrahedrally coordinated sites at (1/2,1/2,1/2) and (3/4,3/4,3/4) in the 2-atom primitive cell, where the fractional coordinates (x,y,z) indicate the fractional position of the atom with respect to the three lattice vectors of the primitive cell: $(1/2,1/2,0)l_c$, $(1/2,0,1/2)l_c$, $(0,1/2,1/2)l_c$, where $l_c$ is the lattice constant (5.40 Å for Si and 5.65 Å for GaAs). In the diamond structure, these two tetrahedrally coordinated sites are equivalent because of the enhanced symmetry of the diamond crystal with only one species. In the GaAs structure, they are different. An interstitial atom at the (1/2,1/2,1/2) tetrahedral site is equidistant to four Ga atoms, while the interstitial at (3/4,3/4,3/4) is equidistant to four As atoms. In the ZB case, the two tetrahedral interstitials should be considered as different defects.

ii. Also the in the ZB and diamond structures there are four possible hexagonally coordinated sites at (1/8, 5/8,5/8,), (5/8,1/8,5/8), (5/8,5/8,1/8), (5/8,5/8,5/8). In the ZB case, two of these are identical under the crystal symmetry, while in the diamond environment all four are identical.

iii. Split and extended interstitial configurations are possible. In these cases, the host crystal atom or atoms move substantially away from their ideal lattice positions to lower the total energy in response to the presence of the interstitial atom. In this way complicated configurations involving displacements of many atoms can accommodate interstitial atoms. In the diamond and ZB lattice the split sites are centered around the lattice sites of the primitive cell at (0,0,0) and (1/4,1/4,1/4). The split interstitial is formed when there is no atom on the lattice site but two atoms on two of the possible four split sites at $(-1,-1,-1)d_s$, $(+1,-1,+1)d_s$, $(-1,+1,+1)d_s$, and $(+1,+1,-1)d_s$ when centered around the lattice site at (0,0,0,) and at $(+1,-1,-1)d_s$, $(+1,+1,+1)d_s$, $(-1,-1,+1)d_s$, $(-1,+1,-1)d_s$, when centered around the second lattice site at (1/4,1/4,1/4), where the splitting parameter $d_s$=0.155 $l_c$ (in Si). The extended split interstitial has two pairs of split interstitial atoms centered on a lattice site with splitting parameter $d_e$=0.085 $l_c$.

iv. Impurity atoms (elements not in the host crystal) can occupy either substitutional sites or interstitials. The number and location of the substitutional sites is the same as for the vacancies; the difference is that instead of no atom being present at the vacancy site in the substitutional defect the impurity atom occupies the site. Interstitial impurity atoms can occupy any of the stable interstitial sites. The menu of possible stable interstitial sites depends on the identity of the interstitial atom, so for each impurity species the stable interstitial sites are determined.

The definition of 'point-like' vs. 'extended' defect is a matter of degree. In the case of the extended split interstitial, there are already four atoms occupying the space associated with three lattice sites. Similar configurations involving vacancies that are spread among several lattice sites exist. There is evidence that these types of extended defect configurations can be relevant, especially at elevated temperatures. The point-like defects can be thought of as those defects with the minimum number of lattice atoms disturbed from their lattice sites. The point-like defect configurations are usually the lowest energy configurations, while extended defects have higher energy and also higher entropy. For this reason the extended defects might be more favored at higher temperatures. In the binary compounds like GaAs such extended defects may be less favorable because of the additional energy cost of forming antisite defects to accommodate extended defects.

While listing the possible point-like defects and only considering those that are expected to be most relevant is common practice in the scientific literature, it is in general not possible to be sure that all the relevant point-like defects have been identified.

In addition, when considering a new material there is often limited reference data or physical intuition to guide the construction of such a list. For these cases, the tool provides procedures that provide for a more comprehensive and systematic, but also more computationally expensive, method for identifying the possible point-like defects in a given host crystal-impurity system.

A supercell of the host crystal is selected using a procedure which can be part of and executed by the tool. The size should be large enough to accommodate the largest defect of interest. For studying basically point-like defects, the necessary size can be determined by converging with respect to supercell size the relaxation of the defect of interest as in the k-point and cut-off convergence tests. To be specific, the defect configuration is created in a small supercell. Then the atoms in the supercell are allowed to adjust their positions (relax) to minimize the total energy of the supercell model. The displacements of the atoms farthest from the defect are measured and if they are larger than some tolerance, $\delta$, the supercell size is increased and the process repeated.

a. Once the appropriate size supercell is determined, the vacancy, substitutional and antisite defect total energies are computed for each defect model by allowing all the atoms in each model to relax and recording the total energy after relaxation. The particular location in the supercell for the defect or impurity is not important because of the crystal symmetry (although the full set of inequivalent lattice sites from the primitive cell should be sampled). In the Si case, only one vacancy location in the supercell needs to be considered because all Si atoms are related by crystal symmetry, while in the GaAs case, two vacancies are required. Sets of random initial displacements of all the atoms in each of the defect models can be used to identify low energy extended-type defects that are separated by an energy barrier from the perfect initial defect configuration. Using a gradually increasing random initial displacement parameter will allow identification of more extended-type defects that are farther in configuration space from the perfect initial configuration.

b. To identify the point-like interstitial defect configurations for both native and impurity interstitials a series of models are constructed consisting of the perfect host crystal supercell and an interstitial at a random point in the supercell volume. From 20 up to 1000000 random locations should be considered—more locations are more expensive but will give better statistics, allow identification of rarer configurations and are necessary to densely cover more complicated crystal structures. To speed up the process, initial random interstitial locations within a distance, $d<d_0$ of any lattice site can be discarded and randomly reselected. This selection criterion will eliminate computationally pathological models in which an interstitial atom is nearly on top of a host crystal atom. Care should be taken not to make $d_0$ larger than a few tenths of an angstrom, though, to be sure possible interstitial sites are not missed.

c. Given the models with randomly placed interstitial atoms, all atoms are fully relaxed to high precision and the total energies and positions of all the atoms are recorded. If the set of random initial locations is large enough, for a given interstitial species all the energies will fall into several groups having essentially the same total energy. Relaxed configurations within a group having the same total energy are the "same" defect. This can be verified geometrically be comparing the relaxed configurations of all the atoms around the defect—configurations in the same group should be related by some symmetry operation of the crystal (translation by a linear combination of primitive crystal lattice vectors). If several groups of geometrically unique configurations exist within the same total energy group, these geometrical groups are degenerate. By binning the models into groups, a reduced number of energetically and geometrically unique interstitial defect configurations for a given interstitial species will be generated. Convergence with respect to the number of random initial locations can be checked by increasing the number of random locations. If the number of unique defect configuration groups does not increase, enough random locations were used. If it does increase, more random defects should be used. Remember that this identification of the possible unique interstitial locations should be carried out independently for each interstitial species of interest.

i. By using a progressively larger average set of initial random displacements of all the atoms in the cell, extended interstitial defect configurations separated by an energy barrier from the point-like configurations can be identified as described above in b.

ii. A related method can be used in which several high temperature melts of the host crystal plus an interstitial atom are allowed to equilibrate at high temperature and are then gradually cooled to zero temperature. The grouping procedure in d is then carried out to identify possible defect configurations. Faster cooling can be expected to capture more extended defects, while very slow cooling rates will capture the lowest energy defects.

iii. The above procedures can also be carried out with multiple interstitial atoms (of the same or different species) to identify unique native or impurity interstitial cluster configurations. Approximately $R^N$ random initial interstitial location sets should be considered, where R is the converged number of single interstitial locations and N is the total number of random interstitial atoms added to each configuration.

iv. The above discussion is applicable to neutral defects. For charged defects, each charge state is treated as a different species, and the above procedures are carried out for each to identify the possible interstitial locations. The selection of the host crystal supercell and the relaxation should be set to be sure the charges do not interact. A correction scheme such as Makov-Payne can be employed to better estimate the total energies.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features.

In particular and without limitation, though many of the inventive aspects are described individually herein, it will be appreciated that many can be combined or used together with each other. All such combinations are intended to be included in the scope of this document.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated.

The invention claimed is:

1. A system comprising:
a memory; and
a processor coupled to the memory and configured to:
produce inputs defining initial conditions of first principles calculations for a specified material of a candidate integrated circuit device;
execute sequences of first principles calculations using the produced inputs;
process results from the first principles calculations to extract device scale parameters from the results;
determine whether the device scale parameters extracted from the results lie within a specified range of stored information for the specified material; and
in response to determining that the extracted device scale parameters do not lie within the specified range, provide updated input parameters for the first principles calculations and repeat the executing and processing.

2. The system of claim 1, wherein the producing of the inputs includes a parameterizing an input parameter of the first principles calculations, executing a set of density functional theory (DFT) computations across an input parameter space to characterize sensitivity of one of an intermediate parameter and an output parameter for the specified material across the input parameter space, and identifying regions in the input parameter space of relatively higher sensitivity and regions in the input parameter space of relatively lower sensitivity,
and wherein the executing of the sequences of the first principles calculations includes executing a second set of DFT computations across the input parameter space in which the second set includes a first subset of computations in the identified regions in the input parameter space of relatively higher sensitivity to changes in the input parameter, and a second subset of computations in the identified regions in the input parameter space of relatively lower sensitivity to changes in the input parameter, the first subset having a higher density in the input parameter space than the second subset.

3. The system of claim 2, wherein the parameterizing of the input parameter includes a first atomistic scale procedure to produce a set of preliminary configurations for the specified material,
and wherein the executing of the sequences of first principles calculations includes a second atomistic scale procedure that utilizes DFT computations to refine the preliminary configurations and to produce a parameter set using refined configurations.

4. The system of claim 3, wherein the processor is further configured to utilize DFT computations to parameterize force field computations.

5. The system of claim 2, wherein the processor is further configured to utilize DFT computations to parameterize force field computations.

6. The system of claim 1, wherein the producing of the inputs includes:
parameterizing an input parameter including a first atomistic scale procedure to produce a set of preliminary configurations for the specified material; and
executing sequences of first principles calculations including a second atomistic scale procedure that utilizes density functional theory (DFT) computations to refine the preliminary configurations and to produce a parameter set using refined configurations.

7. The system of claim 6, wherein the processor is further configured to utilize DFT computations to parameterize force field computations.

8. The system of claim 1, wherein the processor is further configured to utilize DFT computations to parameterize force field computations.

9. An electronic design automation EDA tool comprising:
a memory; and
a processor coupled to the memory and configured to:
produce inputs defining initial conditions of first principles calculations for a specified material of a candidate integrated circuit device;
execute sequences of first principles calculations using the produced inputs; and
process results from the first principles calculations to extract device scale parameters from the results,
wherein the producing of the inputs includes parameterizing an input parameter of the first principles calculations, executing a set of density functional theory (DFT) computations across an input parameter space to characterize sensitivity of one of an intermediate parameter and an output parameter for the specified material across the input parameter space, and identifying regions in the input parameter space of relatively higher sensitivity and regions in the input parameter space of relatively lower sensitivity,
and wherein the executing of the sequences of first principles calculations includes executing a second set of DFT computations across the input parameter space in which the second set includes a first subset of computations in the identified regions in the input parameter space of relatively higher sensitivity to changes in the input parameter, and a second subset of computations in the identified regions in the input parameter space of relatively lower sensitivity to changes in the input parameter, the first subset having a higher density in the input parameter space than the second subset.

10. The tool of claim 9, wherein:
the parameterizing of the input parameter includes a first atomistic scale procedure to produce a set of preliminary configurations for the specified material; and
the executing of the sequences of first principles calculations includes a second atomistic scale procedure that utilizes DFT computations to refine the preliminary configurations and to produce a parameter set using refined configurations.

11. The tool of claim 10, wherein the processor is further configured to utilize DFT computations to parameterize force field computations.

12. The tool of claim 9, wherein the processor is further configured to utilize DFT computations to parameterize force field computations.

13. A method comprising:
producing inputs defining initial conditions of first principles calculations for a specified material of a candidate integrated circuit device;

executing sequences of first principles calculations using the produced inputs; and processing results from the first principles calculations to extract device scale parameters from the results, wherein the producing of the inputs includes:

parameterizing an input parameter including a first atomistic scale procedure to produce a set of preliminary configurations for the specified material; and executing sequences of first principles calculations including a second atomistic scale procedure that utilizes density functional theory (DFT) computations to refine the preliminary configurations and to produce a parameter set using refined configurations.

14. The method of claim 13, further comprising utilizing DFT computations to parameterize force field computations.

15. The method of claim 13, wherein the second atomistic scale procedure utilizes the DFT computations by using the set of preliminary configurations produced from the first atomistic scale procedure as starting parameters of the DFT computations.

16. The method of claim 13, wherein the set of preliminary configurations is produced by the first atomistic scale procedure (i) relaxing a structure of the specified material, (ii) determining a total energy parameter of the relaxed structure or another energy based parameter of the relaxed structure and (iii) producing the set of preliminary configurations based on the determined total energy parameter or the other energy based parameter.

17. An electronic design automation EDA tool comprising:

a memory;

a processor coupled to the memory and configured to:

produce inputs defining initial conditions of first principles calculations for a specified material of a candidate integrated circuit device;

execute sequences of first principles calculations using the produced inputs;

process results from the first principles calculations to extract device scale parameters from the results; and utilize (i) density functional theory (DFT) computations to parameterize force field computations and (ii) the parametrized force field computations to produce estimates of atomic configurations based on a reduced force configuration and to produce a parameter set using the produced estimates of atomic configurations.

18. The tool of claim 17, wherein the force field computations produce the estimates of the atomic configurations based on a minimal force configuration.

* * * * *